(12) United States Patent
Gopalswamy et al.

(10) Patent No.: US 12,518,633 B2
(45) Date of Patent: Jan. 6, 2026

(54) AUTOMATED VEHICLE PLATOONING SYSTEMS AND ASSOCIATED METHODS

(71) Applicant: The Texas A&M University System, College Station, TX (US)

(72) Inventors: Swaminathan Gopalswamy, College Station, TX (US); Michiel Ashley, College Station, TX (US); David Franklin, San Antonio, TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 18/123,200

(22) Filed: Mar. 17, 2023

(65) Prior Publication Data

US 2023/0343220 A1 Oct. 26, 2023

Related U.S. Application Data

(60) Provisional application No. 63/321,494, filed on Mar. 18, 2022.

(51) Int. Cl.
*G08G 1/00* (2006.01)
*B60D 1/62* (2006.01)
*G05D 1/00* (2024.01)

(52) U.S. Cl.
CPC ............... *G08G 1/22* (2013.01); *B60D 1/62* (2013.01); *G05D 1/0022* (2013.01)

(58) Field of Classification Search
CPC . G08G 1/22; B60D 1/62; B60D 1/145; B60D 1/481; G05D 1/0022; G05D 1/696; G05D 2105/28; G05D 2107/13; G05D 2109/10
See application file for complete search history.

(56) References Cited

U.S. PATENT DOCUMENTS

| | | | |
|---|---|---|---|
| 2010/0013188 A1* | 1/2010 | Ortmann | B60D 1/36 280/477 |
| 2010/0044998 A1* | 2/2010 | Franchineau | B60D 1/36 280/491.1 |
| 2012/0200064 A1* | 8/2012 | Gallego | B60D 1/155 280/446.1 |
| 2018/0029429 A1* | 2/2018 | Janardhana | B62D 15/028 |
| 2019/0118859 A1* | 4/2019 | Ghannam | B62D 6/005 |
| 2020/0238772 A1* | 7/2020 | Niewiadomski | B60D 1/366 |
| 2020/0341467 A1* | 10/2020 | Glendenning | G06Q 10/0832 |
| 2021/0086732 A1* | 3/2021 | Kim | B60W 30/165 |
| 2023/0064300 A1* | 3/2023 | McGrory | B60W 30/02 |

* cited by examiner

*Primary Examiner* — Dale W Hilgendorf
*Assistant Examiner* — Frank T Glenn, III
(74) *Attorney, Agent, or Firm* — Conley Rose, P.C.

(57) ABSTRACT

A vehicle platooning system includes a lead vehicle including a lead powertrain system, a lead steering system, and a lead breaking system, a follower vehicle including a follower powertrain, a follower steering system, a follower braking system, and a follower vehicle control unit wherein the follower powertrain system, the follower steering system, and the follower braking system are each controllable by the vehicle control unit, and a hard connect including a mechanical linkage physically connected between the lead vehicle and the follower vehicle, a sensor unit, and a hard connect control unit configured to control the operation of the follower powertrain system, the follower steering system, and the follower braking system of the follower vehicle based on sensor data provided to the hard connect control unit by the sensor unit.

19 Claims, 10 Drawing Sheets

AUTOMATED VEHICLE PLATOONING SYSTEMS AND ASSOCIATED METHODS

CROSS-REFERENCE TO RELATED APPLICATIONS

This application claims benefit of U.S. provisional patent application Ser. No. 63/321,494 filed Mar. 18, 2022, and entitled "Autonomous Commercial Vehicle Platooning Systems and Associated Methods," which is hereby incorporated herein by reference in its entirety for all purposes.

STATEMENT REGARDING FEDERALLY SPONSORED RESEARCH OR DEVELOPMENT

Not applicable.

BACKGROUND

Various strategies are currently under development for improving the movement of freight across land including strategies for maximizing fuel economy, reducing road congestion, and minimizing the time required for transporting freight across land. One such strategy are road trains in which a single vehicle pulls several trailers connected end-to-end. However, such a strategy requires the provision of an undesirably large lead vehicle (e.g., a power tractor) and present undesirable vehicle dynamics which must be addressed by the driver of the vehicle. Another strategy is commercial vehicle platooning (CVP) in which two or more trucks move in formation with a lead vehicle driven by a human driver and the following vehicles trailing behind the lead vehicle at preset following intervals.

BRIEF SUMMARY OF THE DISCLOSURE

An embodiment of a vehicle platooning system comprises a lead vehicle comprising a lead powertrain system, a lead steering system, and a lead breaking system, a follower vehicle comprising a follower powertrain, a follower steering system, a follower braking system, and a follower vehicle control unit wherein the follower powertrain system, the follower steering system, and the follower braking system are each controllable by the vehicle control unit, and a hard connect comprising a mechanical linkage physically connected between the lead vehicle and the follower vehicle, a sensor unit, and a hard connect control unit configured to control the operation of the follower powertrain system, the follower steering system, and the follower braking system of the follower vehicle based on sensor data provided to the hard connect control unit by the sensor unit. In some embodiments, the hard connect comprises a signal link extending between the lead vehicle and the follower vehicle whereby signals may be transmitted between the lead vehicle and the follower vehicle. In some embodiments, the sensor unit is positioned along the mechanical linkage of the hard connect. In certain embodiments, the sensor unit comprises an angle sensor configured to determine an angle between the mechanical linkage of the hard connect and at least one of the lead vehicle and the follower vehicle, and a position sensor configured to determine a position of a first component of the mechanical linkage relative to a second component of the mechanical linkage. In certain embodiments, the sensor unit comprises an angle sensor configured to determine an angle between the mechanical linkage of the hard connect and at least one of the lead vehicle and the follower vehicle, and a load sensor configured to determine a magnitude of a longitudinally directed force applied to the mechanical linkage. In some embodiments, the sensor unit is positioned on at least one of the lead vehicle and the follower vehicle. In some embodiments, the sensor unit comprises an image sensor configured to capture image data associated with the lead vehicle. In certain embodiments, the sensor data is associated with a position of the follower vehicle relative to the lead vehicle. In certain embodiments, the hard connect control unit is configured to control the operation of the follower powertrain system, the follower steering system, and the follower braking system of the follower vehicle to minimize a difference between a predefined value and a current value. In some embodiments, the predefined value comprises a predefined position of a first component of the mechanical linkage relative to a second component of the mechanical linkage and the current value comprises the current position of the first component relative to the second component. In some embodiments, the hard connect control unit is in signal communication with a drive by wire (DbW) system of the follower vehicle associated with the follower powertrain system, the follower steering system, and the follower braking system of the follower vehicle.

An embodiment of a hard connect for connecting a lead vehicle to a follower vehicle of a vehicle platoon comprises a mechanical linkage comprising a lead end connector located at a lead end of the mechanical linkage and configured to mechanically connect the mechanical linkage to the lead vehicle, and a follower end connector located at an opposing follower end of the mechanical linkage and configured to mechanically connect the mechanical linkage to the follower vehicle, a sensor unit configured to provide sensor data associated with the position of the follower vehicle relative to the lead vehicle, and a hard connect control unit configured to autonomously drive the follower vehicle based on the sensor data provided to the hard connect control unit by the sensor unit. In some embodiments, the mechanical linkage comprises a compliance unit including a compliance member configured to permit the longitudinal length of the mechanical linkage extending between the lead end connector and the follower end connector to vary during the operation of the vehicle platoon. In some embodiments, the compliance member comprises one or more biasing members. In certain embodiments, the compliance member comprises a cylinder and a piston slidably disposed within the cylinder. In certain embodiments, the sensor data is associated with a position of the follower vehicle relative to the lead vehicle.

An embodiment of a method for operating a vehicle platoon comprises (a) driving by a human operator a lead vehicle of the vehicle platoon, (b) transferring loads between the lead vehicle and a follower vehicle of the vehicle platoon by a mechanical linkage of a hard connect connected between the lead vehicle and the follower vehicle, and (c) autonomously driving the follower vehicle by a hard connect control unit of the hard connect based on sensor data provided to the hard connect control unit by a sensor unit of the hard connect. In some embodiments, the sensor data is associated with a position of the follower vehicle relative to the lead vehicle. In some embodiments, (c) comprises controlling the operation of a follower powertrain system, a follower steering system, and a follower braking system of the follower vehicle. In certain embodiments, the method comprises (d) transmitting signals between the lead vehicle and the follower vehicle along a signal link established by the hard connect between the lead vehicle and the follower vehicle.

BRIEF DESCRIPTION OF THE DRAWINGS

For a detailed description of exemplary embodiments of the disclosure, reference will now be made to the accompanying drawings in which.

DETAILED DESCRIPTION OF THE DISCLOSED EMBODIMENTS

Figure 1:
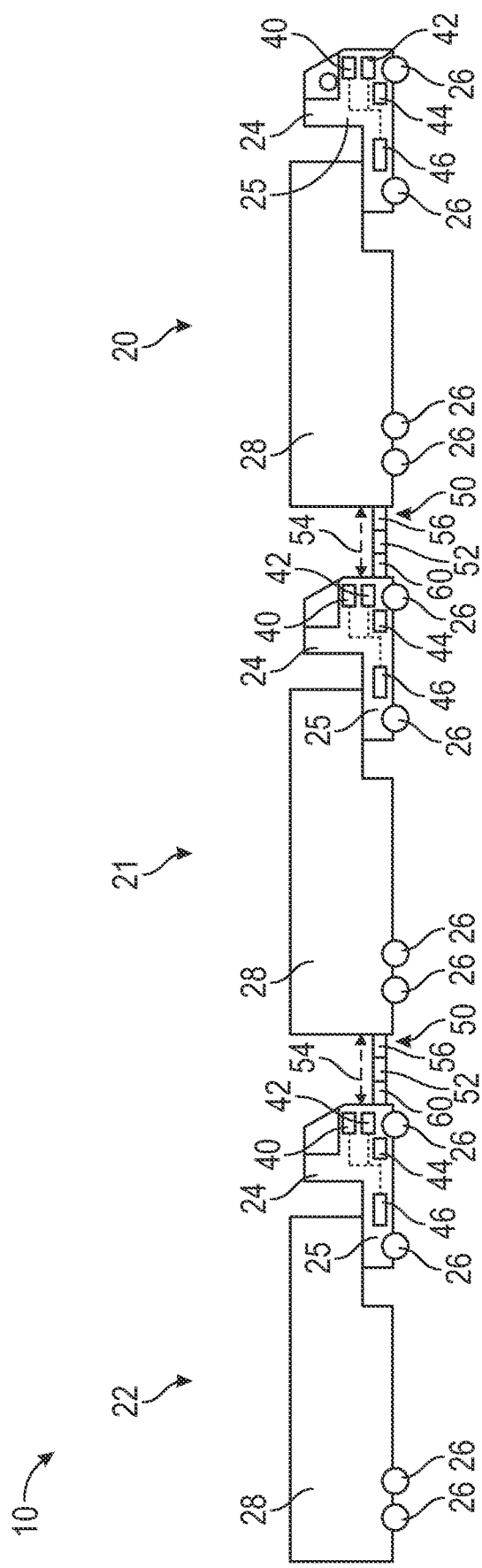
FIG. 1 is a schematic view of an embodiment of a vehicle platooning system in accordance with principles disclosed herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. Further, as used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

As described above, one strategy for improving the movement of freight across land strategy is CVP in which two or more trucks move in formation with a lead vehicle driven by a human driver and the following vehicles trailing behind the lead vehicle at preset following intervals. Particularly, CVP strategies offer the potential of increased fuel economy given that the vehicles of the platoon travel close together, as well as the potential for reduced fatigue of the drivers in the following vehicles. Generally, conventional CVP strategies employ wireless communication links between the vehicles of the platoon such that the vehicles of the platoon are not connected physically together and, instead, a number of sophisticated sensors are employed to achieve the platooning functionality. However, certain limitations present in current autonomous driving functions have hindered the utilization of CVP strategies.

Particularly, traditional CVP systems rely on wireless vehicle-to-vehicle (V2V) which may suffer from issues pertaining to packet loss or delay which can cause the system to perform poorly or fail, in-turn requiring the driver to be ready to take over control of the CVP system and obviating the driver-take-rest benefit of the CVP system. Additionally, traditional CVP systems typically rely on wireless CVP sensors (e.g., cameras, radar) that are generally not robust in all operating conditions. Additional complications arise in traditional CVP sensors when third party vehicles position themselves between different vehicles of the CVP system, often requiring the driver to take control of the CVP system to avoid a potential collision or other issue. Traditional CVP systems may also suffer from other shortcomings such as excessive computational requirements, and poor performance with respect to mirroring or following the path of the lead vehicle of the CVP system by the follower vehicles of the CVP system. For instance, global positioning system (GPS)-based sensors lack the required resolution for proper path following. Accordingly, embodiments of vehicle platooning systems and associated methods in which the vehicles of the platoon are mechanically or "hard" connected together by one or more hard connects extending between the vehicles defining the vehicle platoon. The hard connect provides a physical connection between adjacently positioned vehicles of the platoon. Additionally, the hard connect provides an articulated connection having enough degrees of freedom to allow for smooth motion at the connection. Further, the hard connect is a smart connect configured to autonomously drive the follower vehicle of the platoon such that only the single lead vehicle of the vehicle platoon is required to be driven by a human operator. As used herein, the term "drive" refers to operating the powertrain, steering, and braking systems of a vehicle to transport the driven vehicle from a first location to a second location. Additionally, as used herein, the term "vehicle"

refers to a wheeled vehicle having a powertrain system, a steering system, and a braking system. Embodiments of hard connects disclosed herein permit for data transfer along the connect between adjacently positioned vehicles. In some embodiments, the lead vehicle of the platoon is driven by a human and may not be drive by wire (DbW) enabled. However, the following vehicles of the platoon may be DbW enabled and driven autonomously.

Referring now to FIG. 1, an exemplary embodiment of an automated vehicle platooning system 10 is shown that generally includes a lead vehicle 20 and a pair of follower vehicles 21 and 22 coupled to the lead vehicle 20 using a plurality of articulatable hard connects 50 coupled between the vehicles 20-22. As will be further discussed herein, system 10 additionally includes a hard connect control unit 60 for controlling the operation of at least some of the vehicles 20-22. Vehicles 20-22 are connected end-to-end forming a vehicle train or platoon with lead vehicle 20 at the lead of the platoon. A first follower vehicle 21 is positioned directly behind the lead vehicle 20 and is connected to the lead vehicle 20 by a first hard connect 50 extending between the lead vehicle 20 and the first follower vehicle 21. Additionally, a second follower vehicle 22 is positioned directly behind the first follower vehicle 21 and is coupled to the first follower vehicle 21 by a second hard connect 50 extending between the first follower vehicle 21 and the second follower vehicle 22, with the second follower vehicle 22 forming a rear of the vehicle platoon. While a pair of follower vehicles 21 and 22 are shown in FIG. 1, it may be understood that in other embodiments system 10 may include only a single follower vehicle 21 or more than two follower vehicles 21 and 22.

In this exemplary embodiment, each vehicle 20-22 of system 10 comprises a tractor-trailer generally including a tractor 24 and a trailer 28 coupled to the tractor 24. While in this exemplary embodiment vehicles 20-22 comprise tractor-trailers, it may be understood that in other embodiments the vehicles 20-22 of system 10 may comprise other types of land-based vehicles including both other types of commercial vehicles (e.g., busses) and/or passenger vehicles (e.g., passenger cars or trucks). The tractor 24 of each vehicle 20-22 includes a chassis 25, a steering system 40 for steering one or more wheels 26 of the tractor 24, a powertrain 42 for powering one or more wheels 26 of tractor 24, a braking system 44 for braking the vehicle 20-22, and a vehicle control unit 46 for controlling the various systems (e.g., steering system 40, powertrain system 42, and braking system 44) of the vehicle 20-22.

The tractor chassis 25 of tractor 24 physically supports the steering system 40, powertrain system 42, and braking system 44. Steering system 40 includes components and features for steering one or more of the wheels 26 of tractor 24. For example, the steering system 40 of each vehicle 20-22 may include a steering wheel, a steering actuator configured to monitor a steering input provided to the steering wheel, and a steering linkage connected between the steering actuator and the one or more wheels 26 steered by the steering system 40. In this configuration, the steering actuator may produce a mechanical output (e.g., a rotational output such as a rotational torque) that is transmitted by the steering linkage to the one or more wheels 26 steered by the steering system 40.

The powertrain system 42 of vehicles 20-22 comprises components and features for powering one or more of the wheels 26 of tractor 24. For example, powertrain system 42 may comprise a motor or engine (e.g., an electric motor, an internal combustion engine) configured to produce a rotational output (e.g., a rotational torque, and a transmission configured to transmit the rotational output to the one or more wheels 26 powered by the powertrain system 42. The powertrain system 42 may additionally include throttle actuator configured to control a throttle of the engine/motor of the powertrain system 42 whereby the throttle actuator may modulate the mechanical power and torque produced by the engine/motor.

The braking system 44 of each vehicle 20-22 comprises components for selectably braking one or more wheels 26 of the vehicle 20-22 to thereby reduce, as desired, the speed of the vehicle 20-22. For example, the braking system 44 may comprise one or more brakes (e.g., drum brakes, disc brakes) controlled by a braking actuator which may take the form of a hydraulic or pneumatic solenoid valve in which hydraulic or pneumatic pressure is utilized to apply the brakes of the braking system 44. It may be understood that wheels 26 of both the tractor 24 and trailer 28 of the vehicle 20-22 may be braked by the braking system 44 in at least some embodiments.

The vehicle control unit 46 of vehicles 20-22 comprises an onboard computer or computing system configured to control at least some of the components of the vehicle 20-22. Particularly, vehicle control unit 46 may control components of each of the steering system 40, powertrain system 42, and the braking system 44. For instance, in this exemplary embodiment, vehicle control unit 46 is in signal communication with the steering actuator of steering system 40 whereby the vehicle control unit 46 may control the operation of the steering actuator and thus of the steering/direction of the vehicle 20-22. The vehicle control unit 46 may control the steering of the vehicle 20-22 based on a steering control input received by the vehicle control unit 46, where the steering control input may be provided by an operator of the vehicle 20-22 and/or by the hard connect control unit 60 of the hard connect 50 associated with the vehicle 20-22. Particularly, the steering control input for the lead vehicle 20 may be provided by a driver of the lead vehicle 20 (e.g., via a steering wheel of the lead vehicle 20) while a steering control input for both of the follower vehicles 21 and 22 may be provided automatically by the hard connect control unit 60. As will be discussed further herein, the control input(s) provided by hard connect control unit 60 may be based on sensor data collected by the hard connects 50 of system 10.

Additionally, in this exemplary embodiment, vehicle control unit 46 is in signal communication with the throttle actuator of the powertrain system 42 whereby the vehicle control unit 46 may control the operation of the powertrain system 42, such as by modulating the power produced by the engine/motor of the powertrain system 42. As with the steering system 40 described above, vehicle control unit 46 may control the powertrain system 42 of the vehicle 20-22 (and hence the speed and/or acceleration of the vehicle 20-22) based on a powertrain control input received by the vehicle control unit 46, where the powertrain control input may be provided by an operator of the vehicle 20-22 and/or by the hard connect control unit 60 of the hard connect 50 associated with the given vehicle 20-22. Particularly, the powertrain control input for the lead vehicle 20 may be provided by a driver of the lead vehicle 20 (e.g., via an acceleration or "gas" pedal of the lead vehicle 20) while a powertrain control input for both of the follower vehicles 21 and 22 may be provided automatically by the hard connect control unit 60.

Further, in this exemplary embodiment, vehicle control unit 46 is in signal communication with the braking actuator of the braking system 44 of the vehicle 20-22 whereby the vehicle control unit 46 may control the operation of the braking system 44 to selectably apply the one or more brakes of the braking system 44 to control the speed and/or deceleration of the vehicle 20-22. As with the steering system 40 and powertrain system 42 described above, vehicle control unit 46 may control the braking system 42 of the vehicle 20-22 based on a braking control input received by the vehicle control unit 46, where the braking control input may be provided by an operator of the vehicle 20-22 and/or by the hard connect control unit 60 of the hard connect 50 associated with the vehicle 20-22. Particularly, the braking control input for the lead vehicle 20 may be provided by a driver of the lead vehicle 20 (e.g., via a brake pedal of the lead vehicle 20) while a braking control input for both of the follower vehicles 21 and 22 may be provided automatically by the hard connect control unit 60 of one of the hard connects 50. Thus, in at least some embodiments, the steering, acceleration or "gas," and brakes of the lead vehicle 20 are controlled by a driver of the lead vehicle 20 while the steering, gas, and brakes of the follower vehicles 21 and 22 are controlled by the hard connect control unit 60 based on sensor feedback provided by the hard connects 50. In at least some embodiments, systems 40, 42, and 44 of vehicles 20-22 may each define a drive-by-wire (DbW) system that allows each of the systems 40, 42, and 44 to interface with the vehicle control unit 46 thereof. Additionally, and as will be discussed further herein, vehicle control unit 46 typically includes one or more additional ports through which a separate computer system may interface with the vehicle control unit 46, such as the hard connect control unit 60 of one of the hard connects 50. In this manner, hard connect control unit 60 may control the various systems (e.g., systems 40, 42, and 44) of follower vehicles 21 and 22 through their respective vehicle control units 46, where the vehicle control units 46 comprise standard equipment of the follower vehicles 21 and 22 installed during the original assembly of the vehicles 21 and 22.

The hard connects 50 of system 10 provide a hard or physical/mechanical connection between each of the vehicles 20-22 of system 10 such that vehicles 20-22 may remain mechanically connected together during their operation. As will be discussed further herein, in this exemplary embodiment, the hard connect 50 coupled between the lead vehicle 20 and the first follower vehicle 21 is associated with the first follower vehicle 21, and the hard connect 50 coupled between the first follower vehicle 21 and the second follower vehicle 22 is associated with the second follower vehicle 22.

In this exemplary embodiment, each hard connect 50 comprises a mechanical linkage 52, a signal link 54, and a hard connect control unit 60. The mechanical linkage 52 defines the mechanical connection formed between the vehicles connected by the hard connect 50 while signal link 54 defines a signal link or connection between the pair of vehicles whereby signals and data may be communicated between the pair of vehicles along the signal link 54. In some embodiments, signal link 54 comprises a hardwired signal link or connection such as a cable or cable bundle that extends physically between the pair of vehicles, where the hardwired signal link may be coupled directly to the mechanical linkage 52 (e.g., extending internally through the mechanical linkage 52 or the hardwired signal link may be physically separate from the mechanical linkage 52.

Additionally, in other embodiments, signal link 54 may comprise a wireless signal link configured to communicate signals and data wirelessly between the pair of vehicles coupled to the hard connect 50. For example, the signal link 54 may comprise a first wireless transceiver coupled to a first vehicle coupled to the hard connect 50, and a second wireless transceiver coupled to the second vehicle coupled to the hard connect 50 whereby a wireless link is formed between the pair of vehicles and their corresponding wireless transceivers.

As described above, mechanical linkage 52 of hard connect 50 physically connects the pair of vehicles coupled to the hard connect 50. Particularly, the mechanical linkage 52 provides a flexible connection between the pair of vehicles whereby the pair of vehicles may be disposed at angles towards each other (e.g., disposed at different angles as the pair of vehicles rounds a corner). Additionally, the hard connect 50 allows for at least some variation in the distance between the pair of vehicles such that opposing longitudinal ends of the hard connect 50 may extend and retract relative to each other during the operation of system 10.

In addition to mechanical linkage 52, signal link 54, and hard connect control unit 60, each hard connect 50 also comprises a sensor unit or package 56 comprising one or more sensors and configured to provide sensor feedback to the hard connect control unit 60 of the hard connect 50. For example, the senor unit 56 may comprise a load sensor, a position sensor (e.g., a proximity sensor), and/or an optical sensor (e.g., a video camera). In some embodiments, sensor unit 56 is coupled to the mechanical linkage 52 of the hard connect 50 or otherwise positioned therealong. However, in other embodiments, sensor unit 56 may be separate from the mechanical linkage 52. For example, in certain embodiments, sensor unit 56 may be positioned on or within the vehicles 20, 21, and/or 22 themselves rather than along the mechanical linkages 52 of hard connects 50. In this exemplary embodiment, sensor unit 56 is configured to monitor and collect sensor data pertaining to certain parameters of the vehicles 20-22. For example, sensor unit 56 may monitor the relative orientation of the pair of vehicles coupled to the hard connect 50 comprising the given sensor unit 56. Additionally, in some embodiments, sensor unit 56 monitors the distance between the pair of vehicles coupled to the hard connect. In certain embodiments, sensor unit 56 monitors a load (e.g., a tensile or compressive load) applied to the mechanical linkage 52 of the hard connect 50 where the load may be transferred to the mechanical linkage 52 from one of the vehicles coupled to the hard connect 50.

As described above, the hard connect control unit 60 may be used to control various systems of the vehicle 20-22 to the control unit 60 is associated (e.g., the hard connect control unit 60 of the hard connect 50 coupled between vehicles 20 and 21 being associated with vehicle 21). Particularly, the hard connect control unit 60 may control various systems of the vehicle 20-22 to which the hard connect control unit 60 is associated through the vehicle control unit 46 of the vehicle 20-22. In this manner, the hard connect control unit 60 may interface with the vehicle's 20-22 DbW system through the vehicle's 20-22 vehicle control unit 46. For example, the hard connect control unit 60 associated with the first follower vehicle 21 controls, in some embodiments, the steering system 40 (e.g., via controlling the steering actuator of steering system 40), the powertrain system 42 (e.g., via controlling the throttle actuator of the powertrain system 42), and the braking system 44 (e.g., via controlling the braking actuator of the braking system 44) based on feedback provided by the sensor unit 56.

In some embodiments, the hard connect 50 may comprise a self-contained device which may be quickly and conveniently connected between a pair of vehicles (e.g., a pair of the vehicles 20-22) and which utilizes the vehicle's own control architecture (e.g., the vehicle control unit 46 of vehicles 20-22) to drive (brake, steer, and accelerate) autonomously via the hard connect control unit 60 of the hard connect 50 the follower vehicle of the pair of vehicles connected by the hard connect 50. The hard connect 50 also provides a mechanical or "hard" connection between the pair of vehicles that is flexible enough to permit the pair of vehicles to safely traverse a wide variety of terrain.

Figure 2:
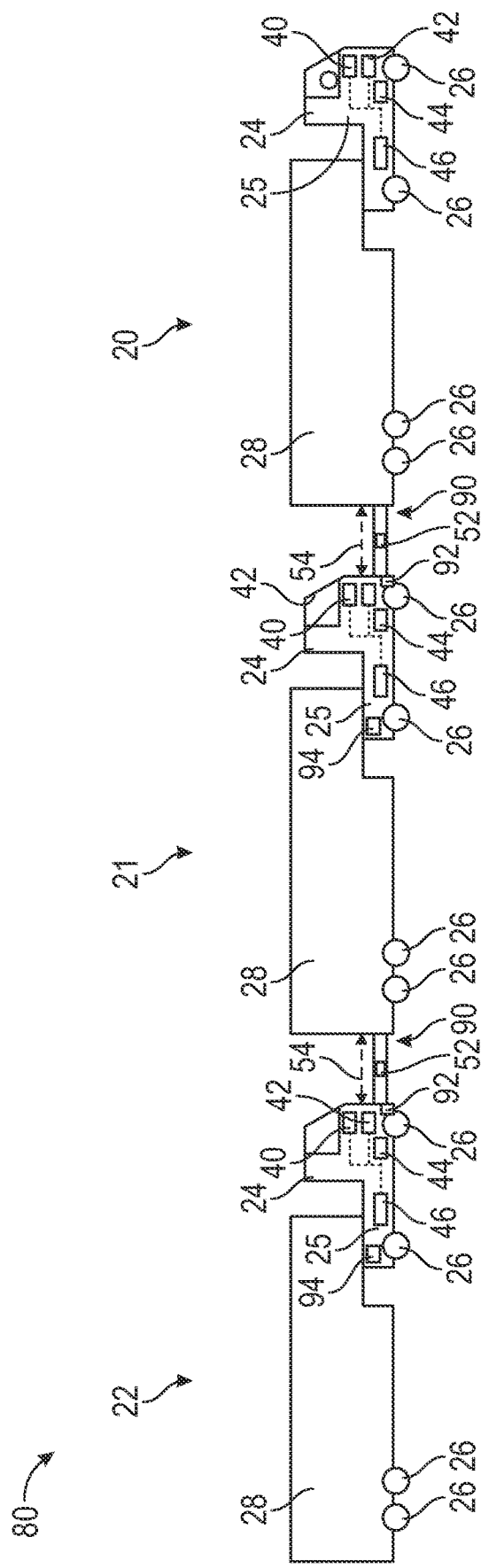
FIG. 2 is a schematic view of another embodiment of a vehicle platooning system in accordance with principles disclosed herein.

Referring briefly to FIG. 2, another embodiment of an automated vehicle platooning system 80 is shown. Vehicle platooning system 80 is similar to the vehicle platooning system 10 shown in FIG. 1, and shared features are labeled similarly. Particularly, vehicle platooning system 80 is similar to system 10 except that system 80 includes a plurality of hard connects 90 having a sensor unit 92 and a hard connect control unit 94 each coupled to the chassis of the vehicle 20 and 21 to which the given hard connect 90 is associated. Thus, the sensor unit 92 and the hard connect control unit 94 of the hard connect 90 connected between the lead vehicle 20 and the first follower vehicle 21 is coupled to the chassis 25 of the first follower vehicle 21 and spaced from the mechanical linkage 52 of the hard connect 90.

In some embodiments, the sensor unit 92 of hard connects 90 comprises one or more optical sensors such as one or more video cameras positioned on the chassis 25 such that a rear of the vehicle directly in front of the sensor unit 92 (e.g., the rear of the lead vehicle 20 for the sensor unit 92 associated with first follower vehicle 21) falls within a field-of-view (FOV) of the sensor unit 92. In this manner, the sensor unit 92 may provide sensor feedback to the hard connect control unit 94 in the form of image data comprising a plurality of images of the rear of the vehicle directly ahead of the vehicle 21 and 22 to which the given hard connect control unit 94 is associated. In certain embodiments, the hard connect control unit 94 of each hard connect 90 includes a machine learning (ML) algorithm (e.g., a convolutional neural network or (CNN)) trained to determine a relative orientation and distance between the pair of vehicles using or based on the image data collected and provided by the sensor unit 92. For example, the ML algorithm may be trained using training data in the form of specialized imaging data having a known or predefined relative orientation and distance between a given pair of vehicles.

Figure 3:
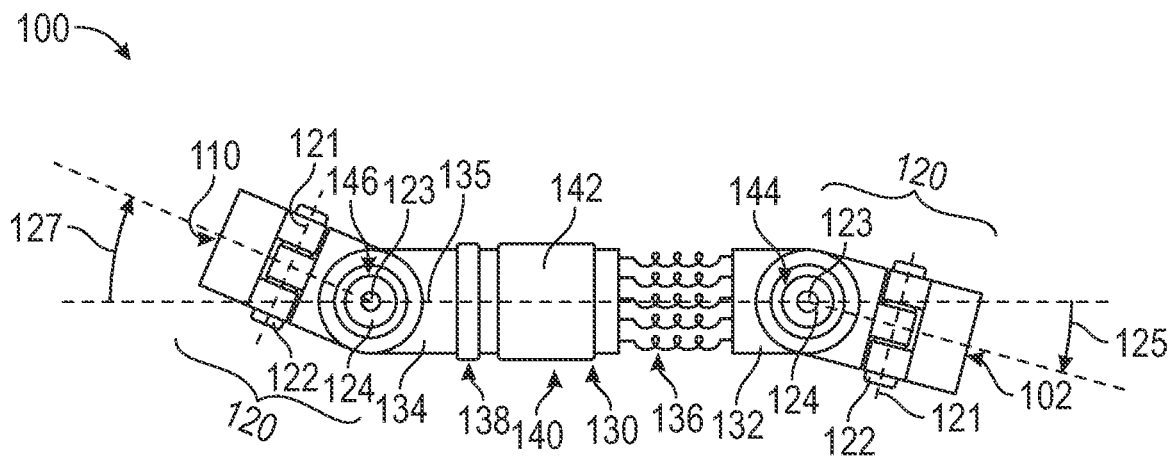
FIG. 3 is a schematic view of an embodiment of a hard connect of a vehicle platooning system in accordance with principles disclosed herein.

Referring now to FIG. 3, an embodiment of a hard connect 100 is shown. The hard connects 50 and 90 shown in FIGS. 1 and 2, respectively, may in some embodiments be configured similarly as the hard connect 100 described below; however, it may be understood that in at least some embodiments the hard connects 50 and 90 of FIGS. 1 and 2 may vary in configuration from the hard connect 100.

In this exemplary embodiment, hard connect 100 generally includes a first or lead connector 102, a second or follower connector 110, a pair of pivot joints 120, and a compliance unit 130 coupled between the pair of pivot joints 120. Initially, it may be understood that hard connect 100 may include components in addition to those shown in FIG. 3. Connectors 102, 110, pivot joints 120, and compliance unit 130 may define a mechanical linkage of the hard connect 100. The lead connector 102 is configured to mechanically connect the hard connect 100 to a first or lead vehicle (e.g., one of vehicles 20 and 21 shown in FIGS. 1 and 2) while the follower connector 110 is configured to mechanically connect the hard connect 100 to a second or follower vehicle (e.g., one of vehicles 21 and 22 shown in FIGS. 1 and 2). Connectors 102 and 110 of hard connect 100 may mechanically connect to their respective vehicles in a variety of arrangement. For instance, in certain embodiments, connectors 102 and 110 mechanically connect to their respective vehicles using one or more fasteners (e.g., screws, bolts, pins, rods) to releasably couple the hard connect 100 to the pair of vehicles. Alternatively, connectors 102 and 110 may be permanently connected to their respective vehicles via, for example, a welding or other bonding process.

The pivot joints 120 permit connectors 102 and 110 to move relative to each other such that the pair of vehicles connected together by the hard connect 100 may safely travel around corners and uneven terrain (e.g., an abrupt increase in grade whereby the lead vehicle may be vertically inclined relative to the follower vehicle). Thus, pivot joints 120 permit the connectors 102 and 110 to move relative to each other about at least one axis. In this exemplary embodiment, each pivot joint 120 is moveable or rotatable about a pair of separate axes 121 and 123 spaced approximately 90 degrees apart. The first axis 121 of the pair of axes 121 and 123 is defined by a first pivot rod or pin 122 (first axis 121 extending centrally through first pivot pin 122) of the pivot joint 120 while the second axis 123 is defined by a second pivot rod or pin 124 (second axis 123 extending centrally through second pivot pin 122) of the pivot joint 120, the second pivot pin 124 being correspondingly spaced approximately 90 degrees from the first pivot pin 122.

The first pivot pin 122 of the pair of pivot joints 120 pivotably couples to the connectors 102 and 110 while the second pivot pins 124 of the pair of pivot joints 120 pivotably couples to an end of the compliance unit 130. In this configuration, a first yaw angle 125 is formed between the lead connector 102 and the compliance unit 130 while a second yaw angle 127 is formed between the compliance unit 130 and the follower connector 110 where yaw angles 125 and 127 may not (at least some of the time) be equal in magnitude.

The compliance unit 130 of hard connect 100 is coupled between the pair of pivot joints 120 and extends along a central or longitudinal axis 135 (which may not be rectilinear). Additionally, compliance unit 130 generally includes a first or lead compliant end member 132, a second or follower compliant end member 134, and a compliant member 136 positioned between the pair of end members 132 and 134 along the central axis 135. The lead compliant end member 132 is pivotably coupled to the second pivot pin 124 of a first or lead pivot joint 120 of hard connect 100 (coupled between the compliant unit 130 and the lead connector 102) while the follower compliant end member 134 is pivotably coupled to the second pivot pin 124 of a second or follower pivot joint 120 of hard connect 100 (coupled between the compliant unit 130 and the follower connector 110).

The compliance member 136 is positioned between the pair of end members 132 and 134 and is generally configured to allow some degree of movement (which may be predefined in some embodiments) between the pair of end members 132 and 134 along central axis 135. To state in other words, the length of compliance unit 130 extending between end members 132 and 134 along central axis 135 may continuously vary as the pair of vehicles connected together by the hard connect 100 travel around corners or over irregular terrain via the extension and retraction of compliance member 136 along central axis 135.

Additionally, in some embodiments, the compliance member 136 of compliance unit 130 provides a resistance to the extension and retraction of the compliance unit 130 along central axis 135. In this exemplary embodiment, compliance member 136 comprises one or more biasing members or springs coupled longitudinally between the pair of end members 132 and 134. In this manner, the one or more biasing members of compliance member 136 resists (via the generation of a spring force) the longitudinal extension and retraction of the compliance member 136. In addition, in this exemplary embodiment, the compliant unit 130 further includes a thrust bearing 138 positioned therealong for supporting longitudinally directed (e.g., directed along central axis 135) forces applied against the compliance unit 130. Such longitudinally directed forces may result from a difference in speed and/or acceleration between the pair of vehicles connected together by the hard connect 100.

In addition to the components described above, hard connect 100 includes a sensor unit 140 comprising a load sensor or cell 142 positioned along the compliance unit 130 and configured to determine and monitor the magnitude of longitudinally directed forces applied against the compliance unit 130. The data collected by the load sensor 142 may be provided to a hard connect control unit of the hard connect 100 (not shown in FIG. 3) as sensor feedback. In addition to load sensor 142, sensor unit 140 includes a first or lead angle sensor 144 and a second or follower angle sensor 146. Lead angle sensor 144 is configured to determine the magnitude of the lead yaw angle 125 while the follower sensor 146 is correspondingly configured to determine the magnitude of the follower yaw angle 127. The data collected by angle sensors 144 and 146 may be provided to the hard connect control unit of hard connect 100 as sensor feedback.

In some embodiments, the hard connect control unit of hard connect 100 (or the control units 60 and 94 of hard connects 50 and 90 shown in FIGS. 1 and 2, respectively) comprises a feedback controller, such as a nonlinear feedback controller, configured to minimize, through controlling the operation of the follower vehicle coupled to the hard connect 100, the magnitude of the longitudinally directed forces applied to the compliance unit 130. Given that it requires longitudinally directed force to overcome the spring force provided by compliance member 136 in this exemplary embodiment, by minimizing the magnitude of longitudinally directed forces applied to compliance unit 130, the hard connect control unit may indirectly minimize the degree of longitudinal extension and retraction of compliance unit 130 resulting from the application of said longitudinally directed forces. In this manner, the hard connect control unit may stabilize motion of the compliance unit 130, and through such stabilization of unit 130, stabilization of the relative positions and trajectories of the pair of vehicles coupled together by the hard connect 100 without needing to utilize a human driver for the follower vehicle.

Figure 4:
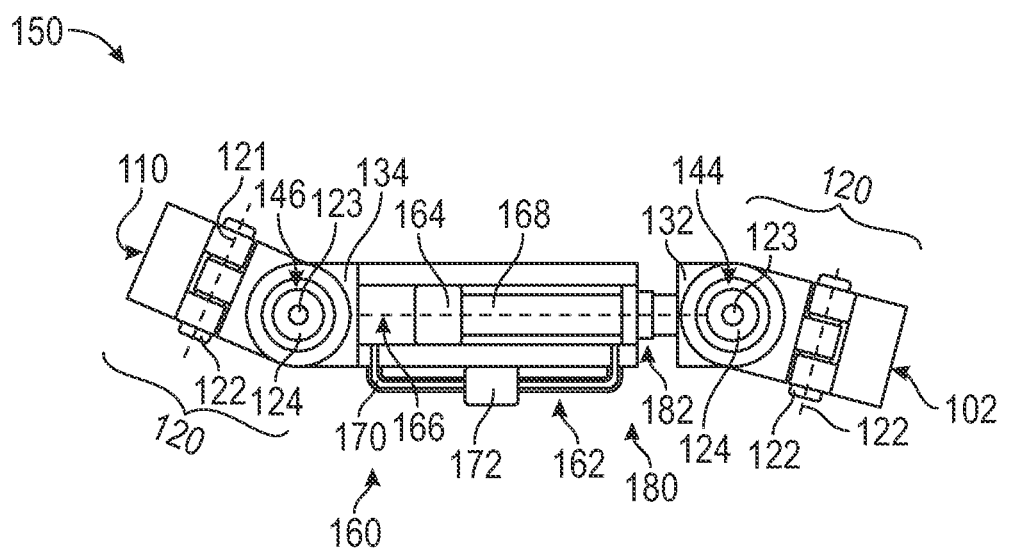
FIG. 4 is a schematic view of another embodiment of a hard connect of a vehicle platooning system in accordance with principles disclosed herein.

Referring now to FIG. 4, an embodiment of a hard connect 150 is shown. The hard connects 50 and 90 shown in FIGS. 1 and 2, respectively, may in some embodiments be configured similarly as the hard connect 100 described below; however, it may be understood that in at least some embodiments the hard connects 50 and 90 of FIGS. 1 and 2 may vary in configuration from the hard connect 100.

Additionally, hard connect 150 includes features in common with the hard connect 100 shown in FIG. 3, and shared features are labeled similarly. Particularly, in this exemplary embodiment, hard connect 150 generally includes connectors 102 and 110, pivot joints 120 pivotably coupled to the connectors 102 and 110, and a compliance unit 160 comprising compliance end members 132 and 134 and a compliance member 162 in the form of a piston 164 slidably received in a corresponding cylinder 166 of the compliance member 162. Particularly, piston 164 is connected to the lead compliant end member 132 by a rod 168 while the cylinder 166 is connected to the follower compliant end member 134 whereby end member 132 is permitted to move relative to end member 134 along a central or longitudinal axis 165 of the compliance unit 160 as the piston 164 moves longitudinally through the cylinder 166. Additionally, compliance member 162 resists relative longitudinal motion between the end members 132 and 134 via the fluid damping provided in response to longitudinal motion of piston 164 through cylinder 166.

Particularly, in this exemplary embodiment, cylinder 166 is filled with fluid (e.g., hydraulic fluid) and the periphery of piston 164 seals or otherwise restricts fluid flow across the annular interface formed between the piston 164 and cylinder 166. Additionally, a fluid bypass circuit 170 is coupled to the cylinder 166 to permit fluid therein to bypass or flow around the piston 164. Further, a valve 172 (e.g., a fluid control valve) is positioned along bypass circuit 170 providing an adjustable restriction to fluid flow through the bypass circuit 170. In this manner, the degree of fluid damping provided by compliance member 162 may be adjusted by altering (via valve 172) the degree of restriction to fluid flow through bypass circuit 170, where an increased restriction to fluid flow through circuit 170 is associated with increased fluid damping due to increased fluid backpressure or drag on the piston 164 as it travels longitudinally through the cylinder 166.

In addition to the components described above, hard connect 100 includes a sensor unit 180 comprising a position sensor 182 coupled the cylinder 166 and configured to determine a longitudinal position (e.g., position along central axis 165) of the piston 164 relative to the cylinder 166. In some embodiments, a hard connect control unit of hard connect 150 (not shown in FIG. 4) comprises a feedback controller, such as a nonlinear feedback controller, configured to minimize, through controlling the operation of the follower vehicle coupled to the hard connect 100, changes to the longitudinal position of the piston 164 relative to the cylinder 166. To state in other words, in some embodiments, the feedback controller of the hard connect control unit is configured to minimize a difference between a predefined longitudinal position of the piston 164 within the cylinder 166 and the actual longitudinal position of the piston 164 within the cylinder 166.

It may be understood that the predefined longitudinal position may not comprise a fixed position and instead may change during the operation of the pair of vehicles coupled together by hard connect 150. Particularly, the predefined longitudinal position of piston 164 within cylinder 166 corresponds to a predefined longitudinal length of the compliance member 162 and compliance unit 160, and thus to a relative distance between the pair of vehicles themselves. It may be desirable to reduce or increase the distance between the pair of vehicles depending on the current trajectory of the pair of vehicles, the type of terrain over which the pair of vehicles is travelling, and/or other parameters.

Figure 5:
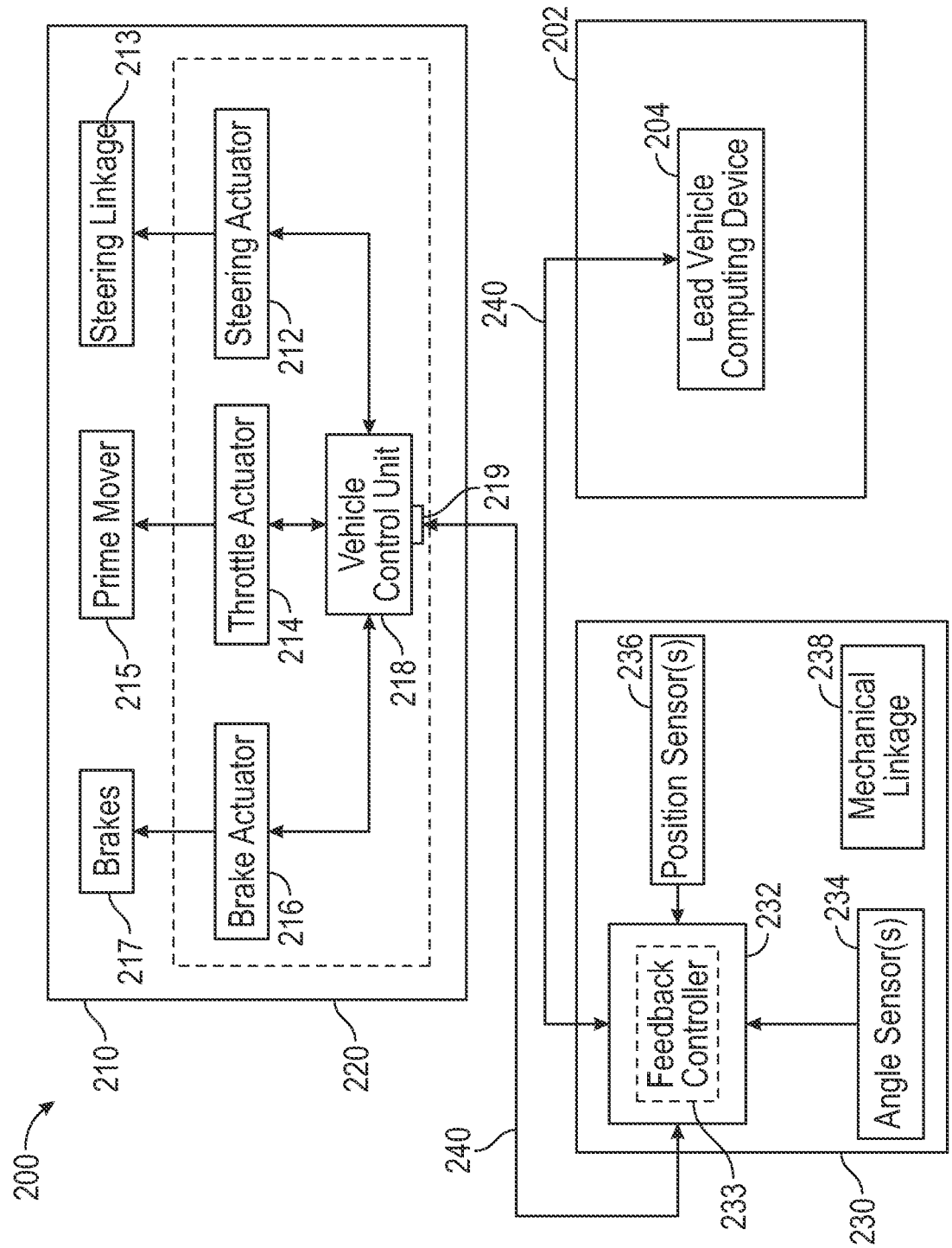
FIG. 5 is a block diagram of another embodiment of a vehicle platooning system in accordance with principles disclosed herein.

Referring now to FIG. 5, a block diagram of another embodiment of a vehicle platooning system 200 is shown. Vehicle platooning system generally includes a first or lead vehicle 202, a second or follower vehicle 210, and a hard connect 230 physically connecting the lead vehicle 202 to the follower vehicle 210. Additionally, hard connect 230 permits the pair of vehicles 202 and 210 to be safely driven by a single driver with the remaining vehicle driven autonomously by the hard connect 230. Particularly, in this exemplary embodiment, the lead vehicle 202 is driven manually by a human operator while the follower vehicle 210 physically or "hard" connected to the lead vehicle 202 by hard connect 230 is driven autonomously by the hard connect 230.

In this exemplary embodiment, the lead vehicle 202 includes a lead vehicle computing device 204 having an interface 206 such as a visual display, a keyboard, etc., through which the driver of the lead vehicle 202 may access information pertaining to the vehicle platooning system 200, including information pertaining to the lead vehicle 202, the follower vehicle 210, and/or the hard connect 230. Particularly, in this exemplary embodiment, the lead vehicle computing device 204 is in signal communication with the follower vehicle 210 via or through the hard connect 230 whereby the driver of the lead vehicle 202 may monitor parameters of the follower vehicle 210, such as the state of various systems of the follower vehicle 210. The driver may also be presented with information from the lead vehicle computing device 204 pertaining to a given state of the vehicle platooning system 200 as determined by a hard connect control unit 232 of the hard connect 230. For example, vehicle platooning system 200 may have a normal state, an impaired state in which system 200 remains operable in spite of one or more components of system 200 having become impaired, and a disabled state. For example, in response to the hard connect control unit 232 determining that the vehicle platooning system 200 is in a disabled state (e.g., in response to determining that one or more critical components of system 200 have become disabled), the lead vehicle computing device 204 may instruct the driver to pull the pair of vehicles 202 and 210 to the side of the road and deactivate the pair of vehicles 202 and 210 as soon as possible.

In this exemplary embodiment, the follower vehicle 210 of vehicle platooning system 200 generally includes a steering actuator 212 (e.g., a rotary actuator), a throttle actuator 214 (e.g., an electronically controlled throttle valve), a braking actuator 216 (e.g., a hydraulic cylinder or motor), and a vehicle control unit 218 (e.g., comprising a computing or computer system) collectively defining a DbW system 220 of the follower vehicle 210. Follower vehicle 210 additionally includes a steering linkage 213, a prime mover 215, and brakes 217. The steering linkage 213 of follower vehicle 210 physically connected between the steering actuator 212 and the one or more wheels steered by the steering linkage 213 whereby the steering linkage 213 may transfer the mechanical output or motion generated by the steering actuator 212 to the steered wheels. The prime mover 215 powers the rotation of one or more wheels of the follower vehicle 210 contingent on an output of the throttle actuator 214. The prime mover 215 may be mechanically connected to the one or more powered wheels by a drivetrain including a transmission and other rotating equipment. The brakes 216 apply a braking force to one or more wheels of the follower vehicle 210 based on an output of the braking actuator 216.

The hard connect 230 of vehicle platooning system 200 comprises the hard connect control unit 232 configured to autonomously drive the follower vehicle 210 based on sensor data associated with a position of the follower vehicle 210 relative to the lead vehicle 202. In some embodiments, the sensor data associated with the position of the follower vehicle 210 relative to the lead vehicle 202 may be in the form of a change in the longitudinal length of the hard connect 230 or a component thereof from a predefined longitudinal length which indicates a change in distance between the pair of vehicles 202 and 210 from a predefined distance. In certain embodiments, the sensor data associated with a position of the follower vehicle 210 relative to the lead vehicle 202 may take the form of a load sensor monitoring load through the hard connect 230 indicative of a change in distance between the pair of vehicles 202 and 210. The hard connect 230 additionally comprises a mechanical linkage 238 physically connecting the lead vehicle 202 with the follower vehicle 210. The hard connect control unit 232 may be positioned on the mechanical linkage 238, the lead vehicle 202, and/or the follower vehicle 210. In some embodiments, at least a portion of the hard connect control unit 232 may be located remotely at a distance from the pair of vehicles 202 and 210.

In this exemplary embodiment, the hard connect control unit 232 drives the follower vehicle 210 based on sensor data collected by one or more angle sensors 234 and one or more position sensors 236. The one or more angle sensors 234 determines or monitors one or more angles associated with an orientation of the follower vehicle 210 relative to the lead vehicle 202 (e.g., a difference between a yaw angle or heading of the follower vehicle 210 relative to a yaw angle or heading of the lead vehicle 202). In some embodiments, the one or more angles correspond to one or more angles between the hard connect 230 (e.g., a compliance unit of the mechanical linkage 238) and the vehicles 202 and 210. Additionally, the one or more position sensors 236 determine or monitor one or more parameters associated with a position of the follower vehicle 210 relative to the lead vehicle 202 such as the distance between the vehicles 202 and 210. In some embodiments, the one or more position sensors 236 determine or monitor a position of a first component of the mechanical linkage 238 relative to a second component of the mechanical linkage 238. In some embodiments, the one or more position sensors 236 directly determine or monitor the position of the follower vehicle 210 relative to the lead vehicle 202 based on image data captured by one or more image sensors positioned on the lead vehicle 202, follower vehicle 210, and/or hard connect 230.

In this exemplary embodiment, the hard connect control unit 232 comprises a feedback controller 233 configured to generate one or more control outputs based on sensor data captured by the one or more angle sensors 234 and the one or more position sensors 236. The one or more control outputs generated by feedback controller 233 may be communicated to the steering actuator 212, throttle actuator 214, and braking actuator 216 of follower vehicle 210 whereby the hard connect control unit 232 may autonomously drive the follower vehicle 210. Additionally, in this exemplary embodiment, a signal link 240 (wired or wireless) is provided by the hard connect 230 between the lead vehicle 202 and the follower vehicle 210 whereby signals and data may be communicated between the lead vehicle 202 and follower vehicle 210. The signal link 240 may conveniently interface with the vehicle control unit 218 of follower vehicle 210 via a pre-existing port 219 of the vehicle control unit 218.

Figure 6:
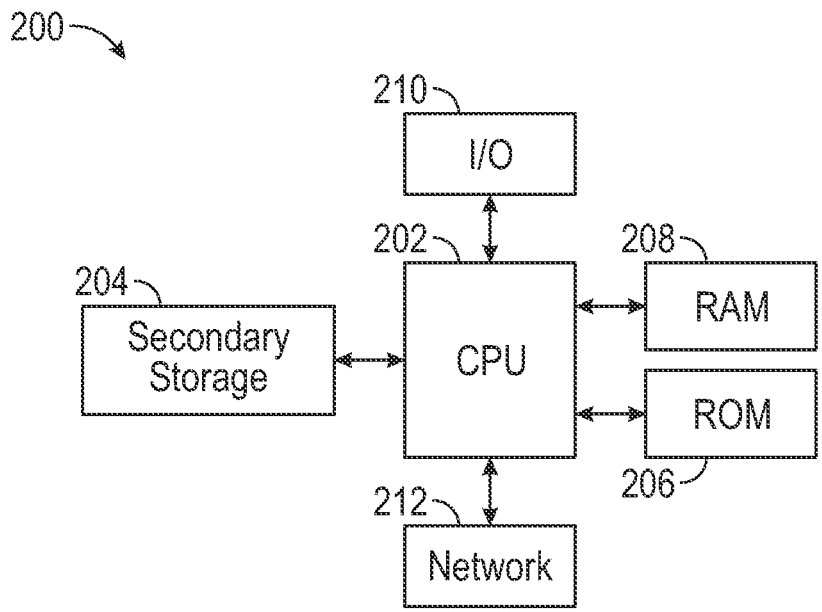
FIG. 6 is a block diagram of a computer system in accordance with principles disclosed herein.

As an example, and referring to FIG. 6, an embodiment of a computer system 250 is shown suitable for implementing one or more components (e.g., the hard connect control units 60, 94, and 232 of FIGS. 1, 2, and 5) disclosed herein. The computer system 250 of FIG. 2 includes a processor 252 (which may be referred to as a central processor unit or CPU) that is in communication with memory devices including secondary storage 254, read only memory (ROM) 256, random access memory (RAM) 258, input/output (I/O) devices 260, and network connectivity devices 262. The processor 252 may be implemented as one or more CPU chips. It is understood that by programming and/or loading executable instructions onto the computer system 250, at least one of the CPU 252, the RAM 258, and the ROM 256 are changed, transforming the computer system 250 in part into a particular machine or apparatus having the novel functionality taught by the present disclosure.

Additionally, after the system 250 is turned on or booted, the CPU 252 may execute a computer program or application. For example, the CPU 252 may execute software or firmware stored in the ROM 256 or stored in the RAM 258. In some cases, on boot and/or when the application is initiated, the CPU 252 may copy the application or portions of the application from the secondary storage 254 to the RAM 258 or to memory space within the CPU 252 itself, and the CPU 252 may then execute instructions that the application is comprised of. In some cases, the CPU 252 may copy the application or portions of the application from memory accessed via the network connectivity devices 262 or via the I/O devices 260 to the RAM 258 or to memory space within the CPU 252, and the CPU 252 may then execute instructions that the application is comprised of. During execution, an application may load instructions into the CPU 252, for example load some of the instructions of the application into a cache of the CPU 252. In some contexts, an application that is executed may be said to configure the CPU 252 to do something, e.g., to configure the CPU 252 to perform the function or functions promoted by the subject application. When the CPU 252 is configured in this way by the application, the CPU 252 becomes a specific purpose computer or a specific purpose machine.

Secondary storage 254 may be used to store programs which are loaded into RAM 258 when such programs are selected for execution. The ROM 256 is used to store instructions and perhaps data which are read during program execution. ROM 256 is a non-volatile memory device which typically has a small memory capacity relative to the larger memory capacity of secondary storage 254. The secondary storage 254, the RAM 258, and/or the ROM 256 may be referred to in some contexts as computer readable storage media and/or non-transitory computer readable media. I/O devices 260 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 262 may take the form of modems, modem banks, Ethernet cards, universal serial bus (USB) interface cards, wireless local area network (WLAN) cards, radio transceiver cards, and/or other well-known network devices. The network connectivity devices 262 may provide wired communication links and/or wireless communication links. These network connectivity devices 262 may enable the processor 252 to communicate with the Internet or one or more intranets. With such a network connection, it is contemplated that the processor 252 might receive information from the network, or might output information to the network. Such information, which may include data or instructions to be executed using processor 252 for example, may be received from and outputted to the network, for example, in the form of a computer data baseband signal or signal embodied in a carrier wave.

The processor 252 executes instructions, codes, computer programs, scripts which it accesses from hard disk, floppy disk, optical disk, flash drive, ROM 256, RAM 258, or the network connectivity devices 262. While only one processor 252 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 254, for example, hard drives, floppy disks, optical disks, and/or other device, the ROM 256, and/or the RAM 258 may be referred to in some contexts as non-transitory instructions and/or non-transitory information.

In an embodiment, the computer system 250 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, the functionality disclosed above may be provided by executing the application and/or applications in a cloud computing environment. Cloud computing may comprise providing computing services via a network connection using dynamically scalable computing resources.

Figure 7:
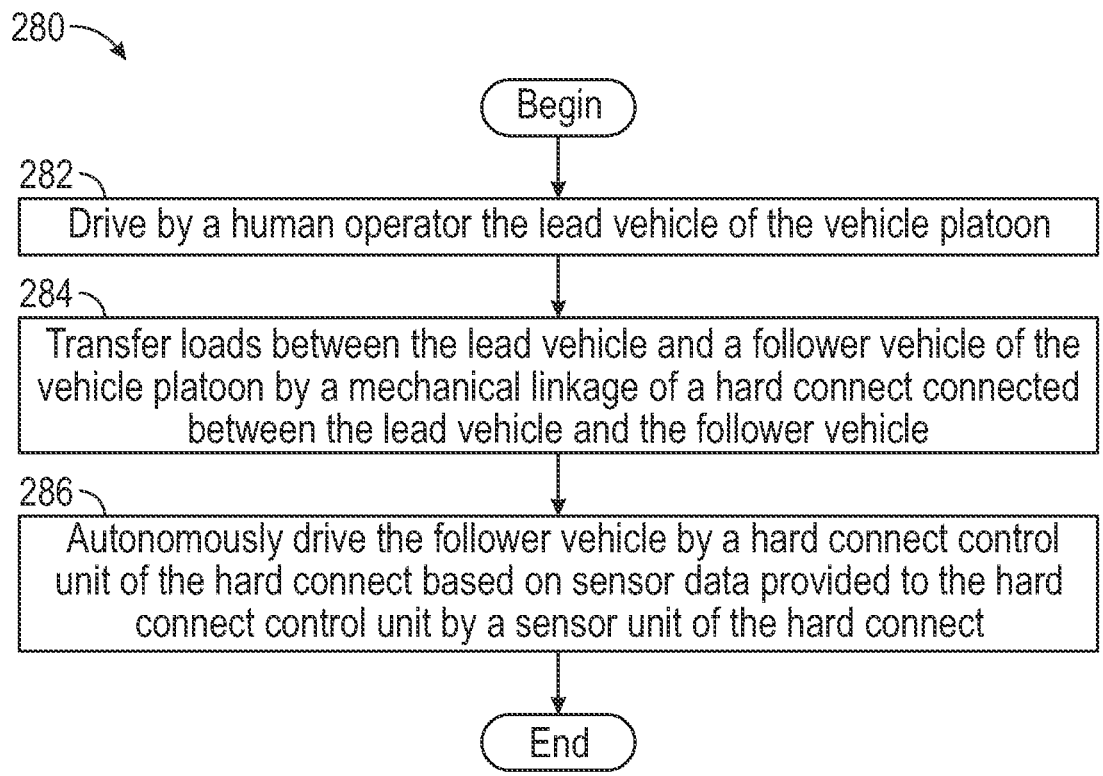
FIG. 7 is a flowchart of an embodiment of a method for operating a vehicle platoon in accordance with principles disclosed herein.

Referring now to FIG. 7, an embodiment of a method 280 for operating a vehicle platoon comprising a lead vehicle and a follower vehicle is shown. Beginning at block 282, method 280 includes driving by a human operator the lead vehicle of the vehicle platoon. At block 284, method 280 comprises transferring loads between the lead vehicle and a follower vehicle of the vehicle platoon by a mechanical linkage of a hard connect connected between the lead vehicle and the follower vehicle. At block 286, method 280 comprises autonomously driving the follower vehicle by a hard connect control unit of the hard connect based on sensor data provided to the hard connect control unit by a sensor unit of the hard connect.

Experiments were conducted pertaining to systems and methods for connecting a plurality of separate vehicles together using hard connects to form a vehicle platooning system. Initially, it may be understood that the following experiments described herein are not intended to limit the scope of this disclosure and the embodiments described above and shown in FIGS. 1-7.

Assumptions and Limitations

Initially, a dynamical system was modeled as a two-dimensional (2D) rigid body whereby pitch, roll, and vertical motion were all neglected. A small hard connect (SHC) was modeled as a massless linear spring, and hitches of trucks and trailers were modeled as frictionless pin joints. This dynamic model did not include aerodynamic forces, rolling resistance, or powertrain dynamics. The 18 wheels on a typical semi truck and trailer were grouped into a steering axle with two tires, a drive axle with two tires, and a single two-tire trailer axle. Additionally, this dynamic model calculated lateral tire forces using a linear tire model. This model only considered a platoon of two vehicles: a leading truck and trailer and a following truck and trailer. Although not a requirement of hard truck platooning (HTP), this experimental study assumed the two trucks did not communicate, so the follower did not have information such as leading steering and throttle input and instead was required to localize itself with information generated in the SHC. Finally, this experimental study assumed that system identification had been performed for the semi-truck and trailer so that the force at the drive wheels of the truck could be controlled directly.

Rigid Body Dynamics

Figure 8:
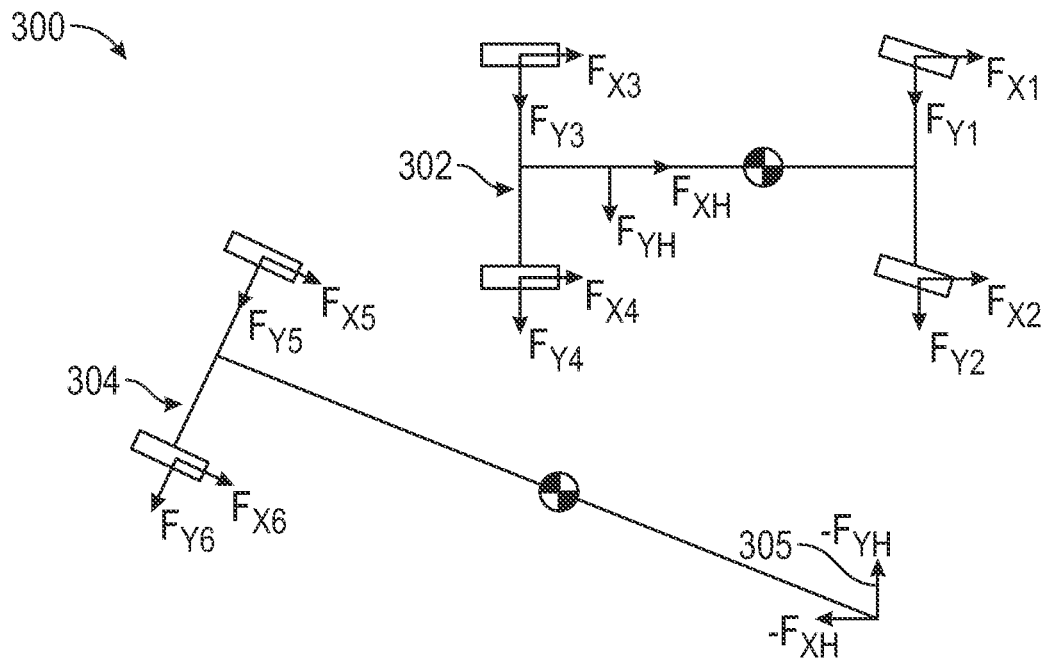
FIG. 8 is a free body diagram of a truck and an associated trailer

As part of this experimental study, a planar dynamic model was developed. Referring now to FIG. 8, a free body diagram 300 is shown indicating the forces which acted on the truck 302 and trailer 304. The truck 302 and trailer 304 were treated as two distinct rigid bodies which were coupled through the forces at a hitch 305. The terms $F_{X1}$ through $F_{X4}$ and $F_{Y1}$ through $F_{Y4}$ were the longitudinal and lateral tire forces acting on the truck 302, while $F_{X5}$, $F_{X6}$, $F_{Y5}$, and $F_{Y6}$ were the tire forces acting on the trailer 304. The terms $F_{XH}$ and $F_{YH}$ were the forces acting at the hitch 305 that connected the truck 302 and trailer 304.

The free body diagram 300 helped develop the basic equations of motion. Because the pin joint at the hitch 305 eliminated two degrees of freedom, there were four remaining degrees of freedom and four equations of motion that were cast in terms of the longitudinal velocity of the truck 302, the lateral velocity of the truck 302, the yaw rate of the truck 302, and the articulation angle of the trailer 304, which was the difference between the yaw angle of the truck 302 and that of the trailer 304. Table I presented below lists the variables representing these and other values associated with the model.

TABLE I

NOMENCLATURE

| Term | Description |
| --- | --- |
| $p_x$ | Truck hitch global x coordinate |
| $p_y$ | Truck hitch global y coordinate |
| u | Truck longitudinal velocity |
| v | Truck lateral velocity |
| θ | Global yaw angle of the truck |
| ψ | Global yaw angle of the trailer |
| r | Yaw rate of the truck |

Not intending to be bound by any particular theory, Equation (1) presented below indicates the state vector of the leading truck 302 and trailer 304 as well as that of the follower. It may be understood that a subscript of (1) denotes that the term is associated with the leader.

$$\zeta_1 = [u_1, v_1, \dot{\psi}_1, \psi_1, \theta_1, p_{x1}, p_{y1}]^T \quad (1)$$

$$\zeta_2 = [u_2, v_2, \dot{\psi}_2, \psi_2, \theta_2, p_{x2}, p_{y2}]^T$$

Because the lead truck was driven by a person and the following truck was driven autonomously, the force at the drive wheels ($\tau_2$) and steering angle ($\delta_2$) of the following truck were the control inputs to the model: $u=[\tau_2, \delta_2]^T$.

Not intending to be bound by any particular theory, the equations of motion used in this experimental study are presented below in Equation (4) where Equation (2) presented below is the mass matrix, and Equation (3) presented below is the forcing function. Additionally, Table II provides a description of the variables of Equations (2)-(4).

$$M(\zeta) = \begin{bmatrix} m & 0 & q_1 & q_1 & & \\ 0 & m & q_3 & -q_2 & 0_4 & \\ 0 & m_v d_v & I_v & 0 & & \\ q_1 & -q_2 & I_t & I_t & & \\ & & & 0_4 & & I_4 \end{bmatrix} \quad (2)$$

$$F_1 = mrv - m_t d_t (\dot{\psi} + r)^2 \cos(\psi) + m_v r^2 d_v + \overline{F}_{xv} + \overline{F}_{xt} \cos\psi - \overline{F}_{yt} \sin\psi$$

$$F_2 = -mur - m_t d_t (\dot{\psi} + r)^2 \sin\psi + \overline{F}_{yv} + \overline{F}_{xt} \sin\psi + \overline{F}_{yt} \cos\psi$$

$$f(\zeta) = \begin{bmatrix} F_1 \\ F_2 \\ -m_v d_v ur + \overline{F}_{zv} \\ m_t d_t r(u\cos\psi + v\sin\psi) + \overline{F}_{zt} \\ \dot{\psi} \\ r \\ u\cos\theta - v\sin\theta \\ -u\sin\theta - v\cos\theta \end{bmatrix} \quad (3)$$

$$M_1(\zeta_1)\dot{\zeta}_1 = f_1(\zeta_1) \quad (4)$$

$$M_2(\zeta_2)\dot{\zeta}_2 = f_2(\zeta_2, u)$$

TABLE II

TERMS IN EQUATION OF MOTION

| Term | Meaning |
| --- | --- |
| $m_v$ | Mass of truck |
| $m_t$ | Mass of trailer |
| $d_v$ | Distance from hitch to truck center of mass |
| $d_t$ | Distance from hitch to trailer center of mass |
| $I_v$ | Truck moment of inertia |
| $I_t$ | Trailer moment of inertia |
| $F_{xv}$ | Sum of longitudinal forces on truck |
| $F_{xt}$ | Sum of longitudinal forces on trailer |
| $F_{yv}$ | Sum of lateral forces on truck |
| $F_{yt}$ | Sum of lateral forces on trailer |
| $F_{zv}$ | Sum of torques on truck |
| $F_{zt}$ | Sum of torques on trailer |
| $q_1$ | $m_t d_t \sin\psi$ |
| $q_2$ | $m_t d_t \cos\psi$ |
| $q_3$ | $m_v d_v - q_2$ |
| m | $m_v + m_t$ |

To consider the entire platoon as one system, both state vectors were concatenated into one combined state vector, $x=[\delta_1, \delta_2]$. Likewise, and not intending to be bound to any particular theory, the equations of motion of Equation (4) above are combined to form the equation of motion presented in Equation (5) below.

$$M_c(x)\dot{x} = f(x,u) \quad (5)$$

Inverting the mass matrix of the combined system $M_c(x)$ in Equation (5) above produces Equation (6) below.

$$\dot{x} = f(x) + g(x,u) \quad (6)$$

Not intending to be bound to any particular theory, the function $g(x,u)$ is linear with respect to the input vector u, so Equation (6) above is an affine system and can be written as presented below in Equation (7).

$$\dot{x} = f(x) + G(x)u \quad (7)$$

Figure 9:
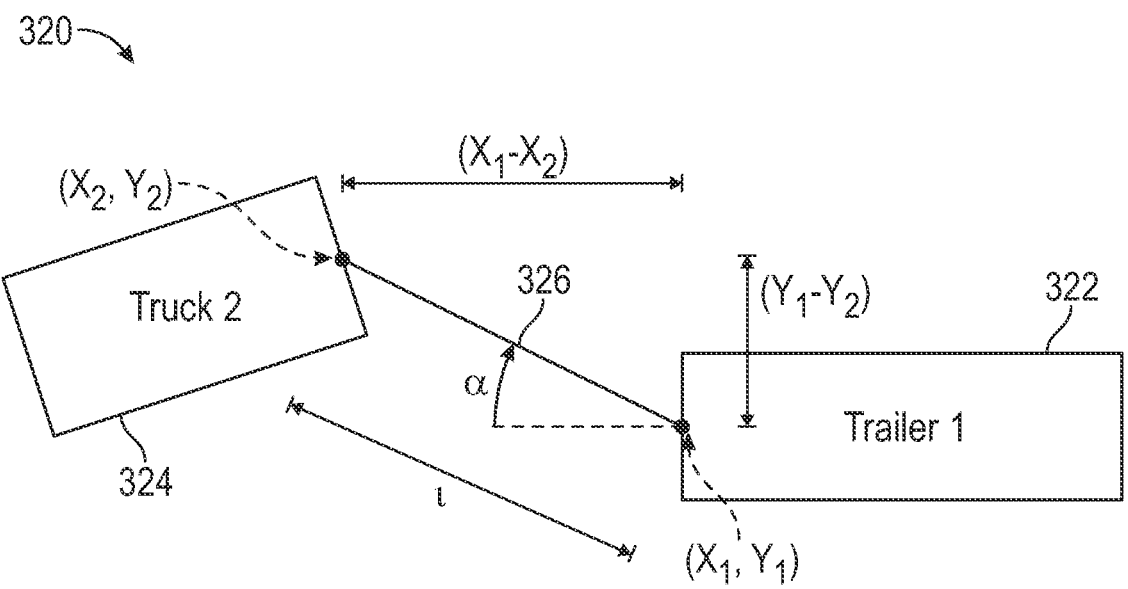
FIG. 9 is a diagram of a leading trailer and a following truck connected together by a hard connect.

Now that the equation of motion for two semi-trucks and trailers had been determined, the forces applied by the SHC were added into the model. Referring to FIG. 9, a diagram 320 of the leading trailer 322 and the following truck 324 connected by the SHC 326 is shown. It may be understood that diagram 320 labels the points ($x_1,y_1$) and ($x_2, y_2$) as well as the length l of the SHC 326 and the angle between the SHC 326 and the longitudinal axis of the leading trailer 322.

Not intending to be bound by any particular theory, the terms α and Δl are defined in Equation (8) presented below, where $l_0$ represents the original uncompressed length of the SHC and Δl represents the change in l. These terms were treated as measured outputs.

$$\Delta l = l_0 = \sqrt{(x_1 - x_2)^2 + (y_1 - y_2)^2} \tag{8}$$

$$\alpha = \arctan\left(\frac{y_1 - y_2}{x_1 - x_2}\right)$$

Controller Design

An experimental HTP control system was developed as part of this experimental study. The goal of the experimental HTP control system was to make the lead driver feel that they are driving their own truck, which implied two goals. First, the forces on the SHC should be zero, or equivalently the SHC extension $\Delta l$ should be zero. Thus, the first control objective was to minimize the output $\Delta l$. Second, the follower trucks should travel through the same path that the lead truck took so the driver can take turns as they normally would. This was translated as a desired value for the SHC articulation angle $\alpha_d$ between the lead trailer and the following truck, and became the second control objective. This can also be expressed as minimizing $\tilde{\alpha} = \alpha - \alpha_d$.

Figure 10:
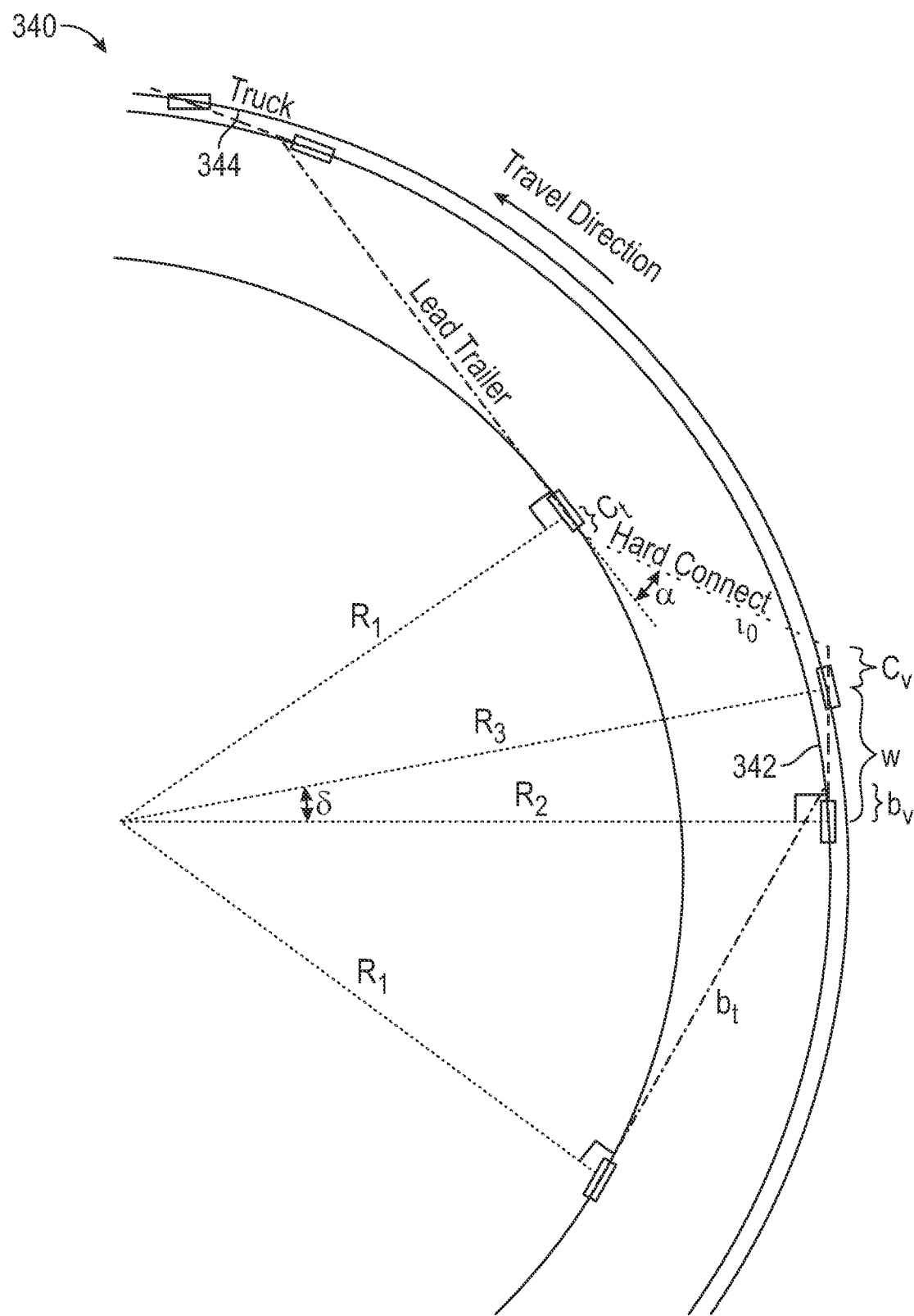
FIG. 10 is a diagram illustrating an articulation angle between a lead truck and a follower truck.

Referring to FIG. 10, a diagram 340 is shown illustrating the articulation angle necessary for a follower truck 342 to travel through the leader's path with a kinematic single-track vehicle model after the articulation angles have reached a steady state for a given turning radius. The desired angle, ad, that allows the follower truck 342 to travel through the lead truck's 344 path was calculated as a function of the follower truck's 342 steering angle since it was a known value. This method of path tracking followed from the assumption that the controller had no other information about the lead truck 344 except $\Delta l$ and the SHC angles. In practice, the steering control was at a much faster time scale than that associated with the truck traversing a curved path. This was leveraged to calculate $\alpha_d$ as a function of a filtered steering angle, $\delta_f$, which then provided an integral separation between $\alpha_d$ and the actual steering angle. Not intending to be bound by any particular theory, the trigonometric relation between $\alpha_d$ and $\delta_f$ is captured in Equation (9) presented below.

$$\alpha_d^*(\delta_f) = \arcsin\left(\frac{(\omega + c_v)^2 - b_v^2 + b_t^2 - c_t^2 - l_0^2}{2l_0\sqrt{\left(\frac{w}{\tan\delta_f}\right)^2 + b_v^2 - b_t^2 + c_t^2}}\right) \tag{9}$$

Equation (9) only provided a solution for a limited range of steering angles, which demonstrated the physical limitations of the model in eliminating the cross-track error. When the steering angle increases such that $\alpha$ reaches $$\pm\frac{\pi}{2},$$

this indicated an imminent collision between the SHC and the truck or trailer. Thus, Equation (9) was saturated to constrain $$\alpha_d \in [-\alpha_{lim}, \alpha_{lim}], \text{ where } \alpha_{lim} = \alpha_d^*(\delta_{crit}) < \frac{\pi}{2}.$$

Defining the deviation of the articulation angle from its desired value as $\tilde{\alpha} = \alpha - \alpha_d$, the two system variables to minimize were elements of the output vector shown by Equation (10) presented below. Under the steady state assumption in FIG. 10, derivatives of $\alpha_d$ were neglected so $\dot{\tilde{\alpha}} = \dot{\alpha}$ and $\ddot{\tilde{\alpha}} = \ddot{\alpha}$.

$$y = \begin{bmatrix} \Delta l \\ \tilde{\alpha} \end{bmatrix} \tag{10}$$

Not intending to be bound by any particular theory, Equations (8) and (10) are summarized in Equation (11) presented below.

$$y = h(x) \tag{11}$$

Equation (11) presents y as a function of x, and in simulation the full state information could be used to calculate these outputs. However, in practice $\Delta l$ and $\alpha$ would be directly measured with sensors, and no state information of the lead vehicle was necessary for the development of the controller.

Given the highly nonlinear nature of the system dynamics, a nonlinear feedback linearization technique was used for the dynamic control of the model. Correspondingly, given that Equation (11) does not include the control input vector u, this equation was differentiated with respect to time repeatedly until the input vector appears. Not intending to be bound by any particular theory, differentiating Equation (11) with respect to time yielded Equation (12) presented below, where $L_f h(x)$ represents the "Lie Derivative" of $h(x)$ with respect to $f(x)$.

$$\dot{y} = L_f h(x) \tag{12}$$

$$\ddot{y} = L_f^2 h(x) + L_g L_f h(x) u \tag{13}$$

The input vector u appears in Equation (13) so there is no need to further differentiate. Further, a direct inspection of the coefficient $L_g L_f h(x)$ indicated it was invertible. Then, choosing the control input vector u as shown in Equation (14) presented below canceled out the nonlinear terms in Equation (13) and set the second derivative of the output vector $\ddot{y}$ equal to a new synthetic input vector v.

$$u = (L_g L_f h(x))^{-1}(-L_f^2 h(x) + v) \tag{14}$$

Not intending to be bound by any particular theory, defining $\bar{y} = [y, \dot{y}]^T$ and substituting Equation (14) into Equation (13) yielded the linear model shown in Equation (15) presented below where A and B are constant matrices.

$$\dot{\bar{y}} = A\bar{y} + Bv \tag{15}$$

Not intending to be bound by any particular theory, choosing $v = -K\bar{y}$ yielded Equation (16) presented below.

$$\dot{\bar{y}} = (A + BK)\bar{y} \tag{16}$$

Figure 11:
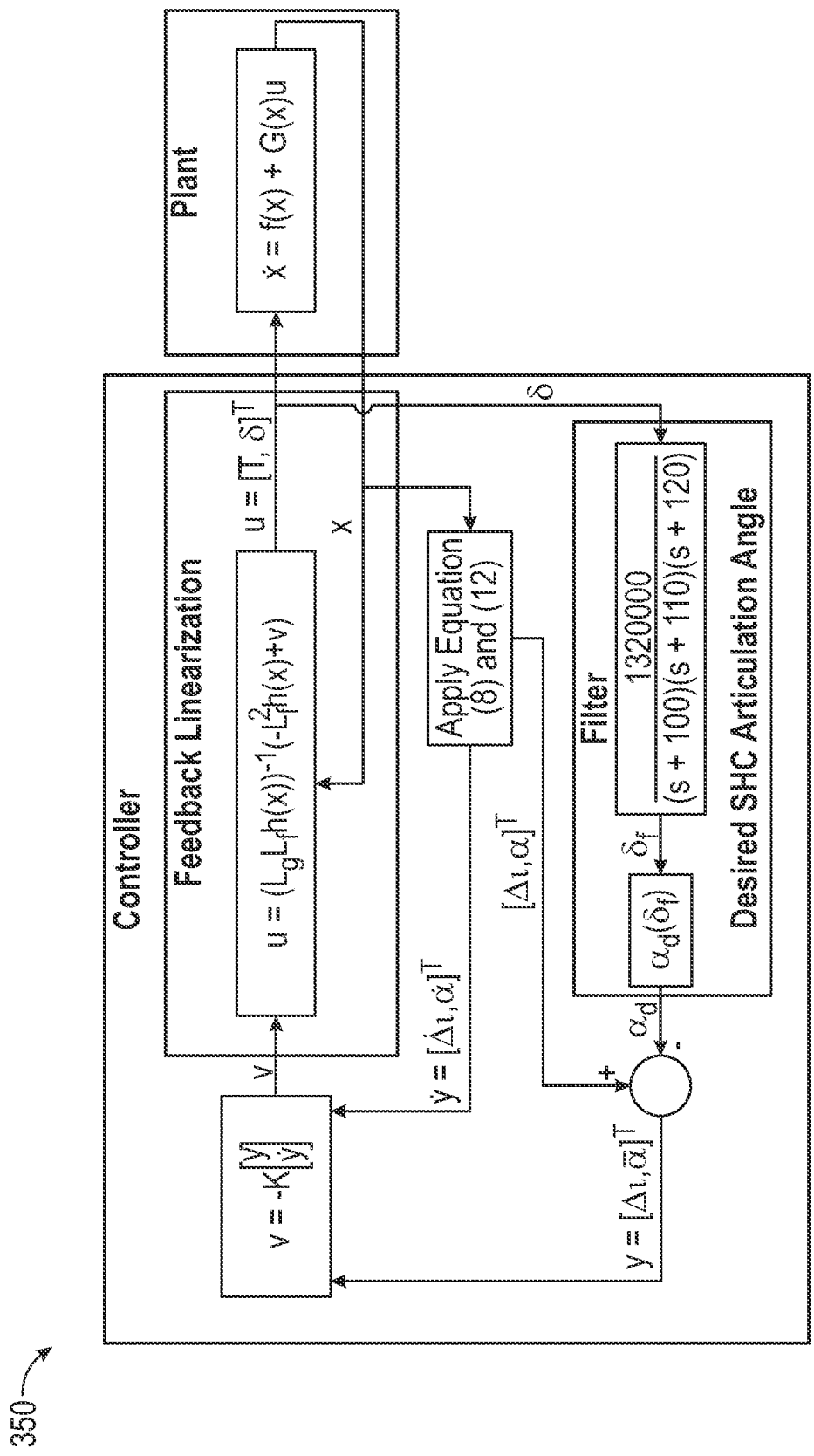
FIG. 11 is a block diagram of a completed model of a vehicle platooning system.

Not intending to be bound by any particular theory, choosing K such that A+BK was Hurwitz ensured that the control objectives ($\Delta l \to 0$ and $\tilde{\alpha} \to 0$) were satisfied. Referring to FIG. 11, a block diagram 350 of the completed model is shown. The plant input u was made up of Lie Derivatives of y obtained from Equation (11). Only the states of the following vehicle and the measured $\Delta l$ and $\alpha$ from Equation (8) were fed back for linearization.

The control system and platoon dynamics shown earlier in this experimental study were simulated using simulation software (MATLAB® and Simulink®). Table III shows the specific values chosen for the simulation.

TABLE III

SIMULATION CONSTANTS

| Term | Value | Units |
|---|---|---|
| Mass of truck | 7050 | Kg |
| Mass of trailer | 23500 | Kg |
| DF hitch to truck front axle | 2.8 | m |
| DF hitch to truck rear axle | 0.7 | m |
| DF hitch to truck center of mass | 1.8 | m |
| Truck front track width | 2 | m |
| Truck rear track width | 2 | m |
| DP hitch to trailer axle | 14 | m |
| DF hitch to trailer center of mass | 7 | m |
| Trailer track width | 2 | m |
| Truck front tire cornering stiffness | 143330 | N/rad |
| Truck rear tire cornering stiffness | 573320 | N/rad |
| Trailer tire cornering stiffness | 321248 | N/rad |
| Truck moment of inertia | 28492 | $Kg \cdot m^2$ |
| Trailer moment of inertia | 1541800 | $Kg \cdot m^2$ |
| DF truck front axle to tow bar joint | 0.7 | m |
| DF trailer axle to tow bar joint | 1.5 | m |
| Tow bar spring stiffness | 180000 | N/m |
| Maximum $\alpha_d$ angle, $\alpha_{lim}$ | 50 | deg |

Note:
"DF" stands for "distance from."

The poles of the model in Equation (16) were chosen to make the models governing $\Delta l$ and $\tilde{\alpha}$ critically damped with natural frequencies of nine and three radians per second (rad/s), respectively. The first simulation showed the behavior of the platoon when the lead truck made a double lane change. Particularly, the lead truck initially drove straight for four seconds before merging left. Then the leader merged right again at about twelve seconds and then drove straight until the end of the twenty-second simulation. In this simulation, both trucks had an initial speed of thirteen meters per second (m/s). The following trailer had an initial articulation angle of −1.5 degrees, and the follower truck had an initial yaw angle of three degrees.

Another simulation was conducted to investigate the platoon's behavior during a U-turn, another common real-world scenario. Particularly, the lead truck drove straight for five seconds, then turned right with a constant steering angle until about thirteen seconds and drove straight until the end of the twenty-second simulation. The radius of the U-turn was about 24 meters. The lead truck drove at a constant speed of seven meters per second. The follower truck had an initial articulation angle of −2 degrees and yaw angle of −1 degree. In both simulations A/and a also had small nonzero initial conditions.

Figure 12:
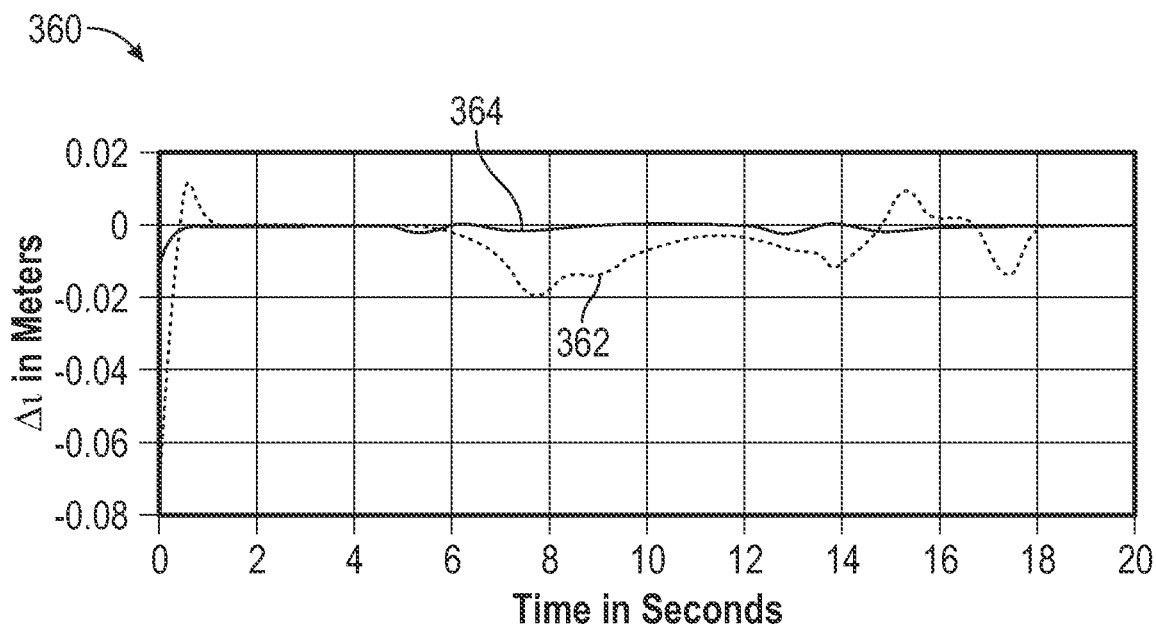
FIG. 12 is a graph illustrating the change in length of a simulated hard connect as a function of time.
Figure 13:
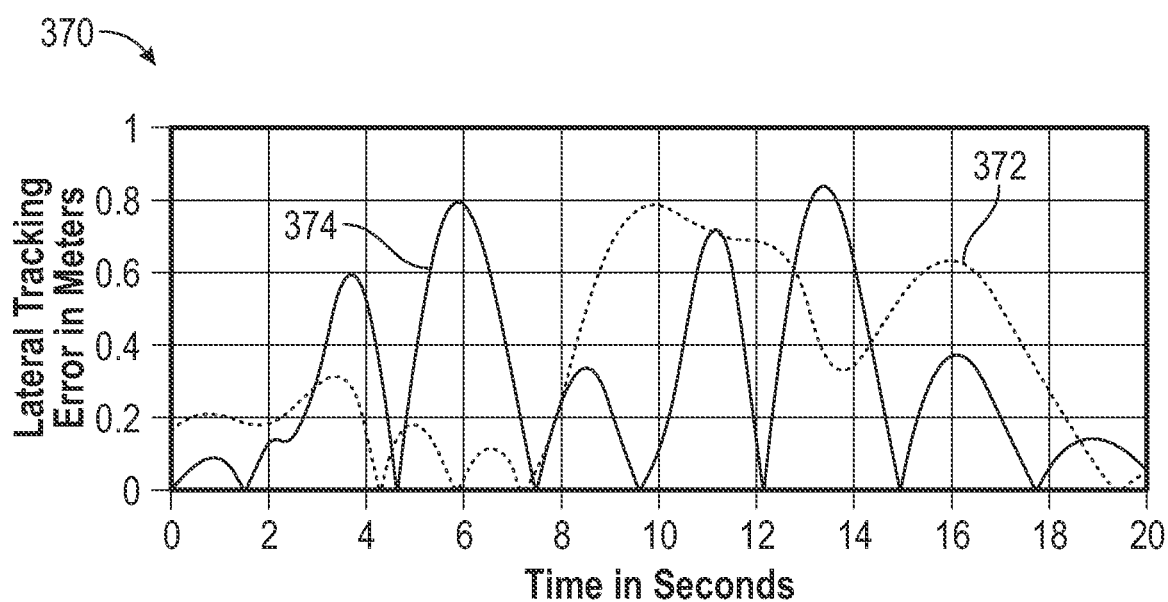
FIG. 13 is a graph illustrating lateral tracking error as a function of time.

Referring to FIGS. 12 and 13, a graph 360 is shown in FIG. 12 indicating A/as a function time (time elapsed during the simulation) for both the U-turn simulation (indicated by numeral 362 in graph 360) and the double lane change simulation (indicated by numeral 364 in graph 360). Additionally, a graph 370 is shown in FIG. 13 indicating lateral tracking error in meters as a function of time for both the U-turn simulation (indicated by numeral 372 in graph 370) and the double lane change simulation (indicated by numeral 374 in graph 370).

The term $\Delta l$ in graph 360 was initially driven towards zero by the controller, and although there were some disturbances during the lane changes and U-turn maneuvers, these were quickly eliminated once the maneuvers were finished. Graph 370 illustrates the distance between the path of following truck and that of the leading truck. Graph 370 generally show that there was some oscillation, but that the error remained under one meter.

Figure 14:
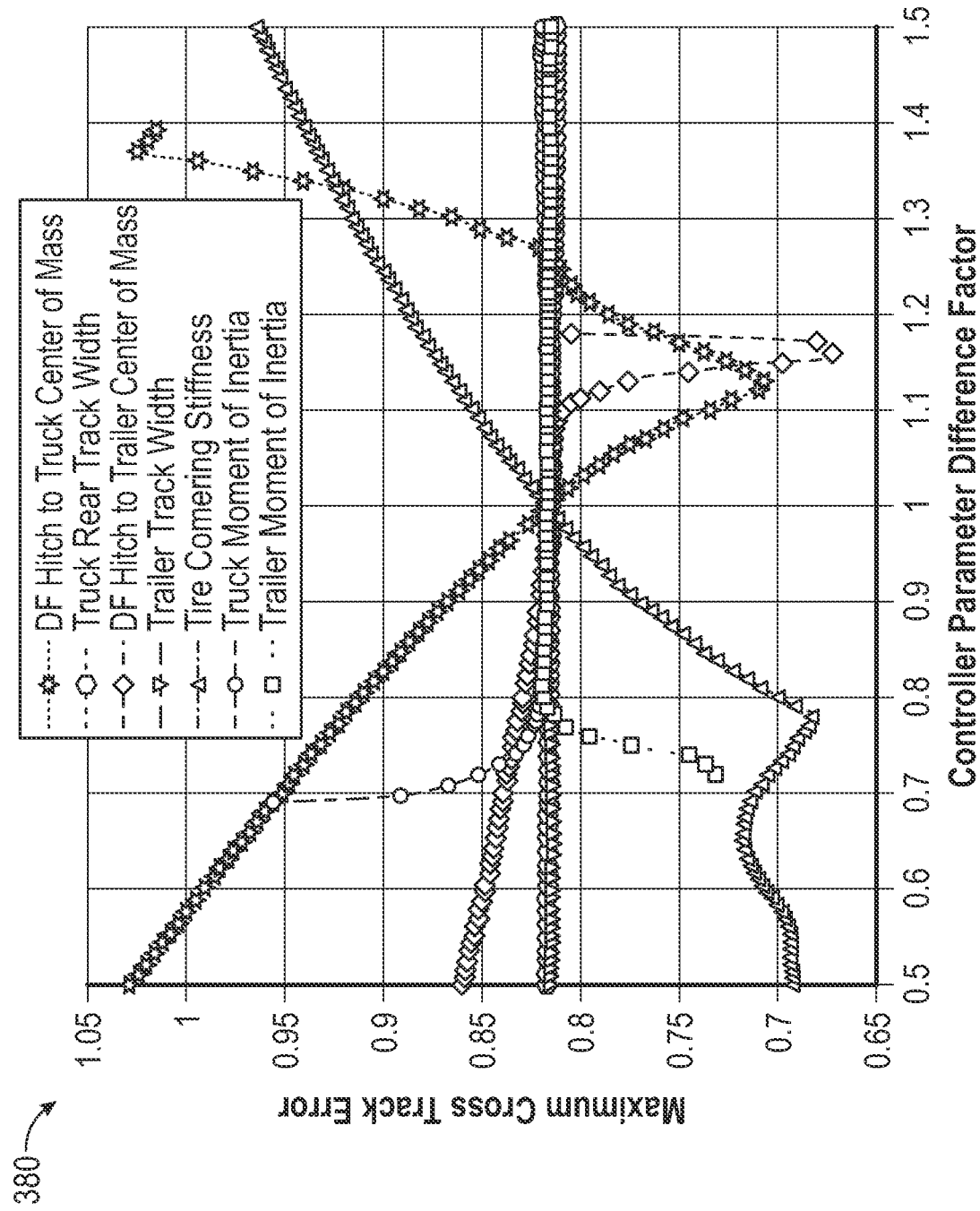
FIG. 14 is a graph illustrating maximum cross track errors for different parameters as a function of controller parameter difference factor.

The controller's response to parameter uncertainties was also investigated using the U-turn scenario. Referring to FIG. 14, a graph 380 is shown illustrating maximum cross track errors for different simulated parameters as a function of controller parameter difference factor. Particularly, graph 380 shows how the maximum cross track error changed as the controller's knowledge of the system parameters was varied one at a time. In the base case, when the controller parameters matched the plant, the maximum cross track error was about 0.8 meters. The parameters to vary were chosen since they were thought to be some of the most difficult to measure.

Where the points are missing in graph 380, the simulation failed to run. In these scenarios, the actuators became saturated and the tire slip angles became large, thereby invalidating the linear tire model. Using the maximum lateral tracking error metric, the most sensitive parameter was the distance from the hitch to the trailer's center of mass with an 19% overestimate causing the simulation to fail. The nominal value for this parameter was seven meters, so it was varied from 3.5 to 10.5 meters.

The development of a nonlinear control strategy for the follower vehicle in a novel "Hard Truck Platooning" configuration was presented by this experimental study. This controller enabled the lead vehicle driver to drive as if they were operating just one vehicle. The controller was demonstrated on a two-truck-trailer formation. Using only the information generated by the embedded sensors in the smart hard connect and the DbW system, it was demonstrated by this experimental study that the follower vehicle pulled its own weight and travels through the leader's path. Simulation results indicated that realistic driving scenarios could be achieved with cross track errors under one meter. It was also demonstrated that the designed control method can tolerate a range from −28% to +18% of parameter uncertainty.

Further, It may be understood that HTP seeks to fully realize the benefits of truck platooning with additional safety and reliability. The concepts developed in this experimental study may be extended to other applications such as certain mining operations, transit busses or other applications.

While embodiments of the disclosure have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A vehicle platooning system, comprising:
    a first vehicle comprising a first powertrain system, a first steering system, and a first breaking system;
    a second vehicle comprising a second powertrain, a second steering system, a second braking system, and a second vehicle control unit wherein the second powertrain system, the second steering system, and the second braking system are each controllable by the second vehicle control unit; and a hard connect, comprising:

a mechanical linkage comprising a lead end pivot joint and a lead end connector located at a lead end of the mechanical linkage to pivotably connect by the lead end pivot joint the mechanical linkage to the lead vehicle whereby a non-zero lead end angle is formable between a central axis of the mechanical linkage and the lead vehicle, and a follower end pivot joint and a follower end connector located at an opposing follower end of the mechanical linkage to pivotably connect by the follower end pivot joint the mechanical linkage to the follower vehicle whereby a non-zero follower end angle is formable between the central axis and the follower vehicle that is separate from the lead end angle, and wherein the follower end connector is translatable along the central axis relative to the lead end connector a sensor unit; and a hard connect control unit comprising one or more processors and a storage device coupled to the one or more processors, the storage device configured to store instructions that, when executed by the one or more processors, configure the one or more processors to control the operation of the first powertrain system, the first steering system, and the first braking system of the first vehicle based on sensor data provided to the hard connect control unit by the sensor unit when the first vehicle is connected to the hard connect as a follower vehicle of the vehicle platooning system, and to control the operation of the second powertrain system, the second steering system, and the second braking system of the second vehicle based on sensor data provided to the hard connect control unit by the sensor unit when the second vehicle is connected to the hard connect as the follower vehicle of the vehicle platooning system.

2. The vehicle platooning system of claim 1, wherein the hard connect comprises a signal link extending between the first vehicle and the second vehicle whereby signals may be transmitted between the first vehicle and the second vehicle.

3. The vehicle platooning system of claim 1, wherein the sensor unit is positioned along the mechanical linkage of the hard connect.

4. The vehicle platooning system of claim 3, wherein the sensor unit comprises an angle sensor configured to determine an angle between the mechanical linkage of the hard connect and at least one of the first vehicle and the second vehicle, and a position sensor configured to determine a position of a first component of the mechanical linkage relative to a second component of the mechanical linkage.

5. The vehicle platooning system of claim 3, wherein the sensor unit comprises an angle sensor configured to determine an angle between the mechanical linkage of the hard connect and at least one of the first vehicle and the second vehicle, and a load sensor configured to determine a magnitude of a longitudinally directed force applied to the mechanical linkage.

6. The vehicle platooning system of claim 1, wherein the sensor unit is positioned on at least one of the first vehicle and the second vehicle.

7. The vehicle platooning system of claim 6, wherein the sensor unit comprises an image sensor configured to capture image data associated with the first vehicle.

8. The vehicle platooning system of claim 1, wherein the sensor data is associated with a position of the second vehicle relative to the first vehicle.

9. The vehicle platooning system of claim 1, wherein the hard connect control unit is configured to control the operation of the second powertrain system, the second steering system, and the second braking system of the second vehicle to minimize a difference between a predefined value and a current value.

10. The vehicle platooning system of claim 9, wherein the predefined value comprises a predefined position of a first component of the mechanical linkage relative to a second component of the mechanical linkage and the current value comprises the current position of the first component relative to the second component.

11. The vehicle platooning system of claim 1, wherein the hard connect control unit is in signal communication with a drive by wire (DbW) system of the second vehicle associated with the second powertrain system, the second steering system, and the second braking system of the second vehicle.

12. A hard connect for connecting a lead vehicle to a follower vehicle of a vehicle platoon, the hard connect comprising:

a mechanical linkage comprising a lead end pivot joint and a lead end connector located at a lead end of the mechanical linkage to pivotably connect by the lead end pivot joint the mechanical linkage to the lead vehicle whereby a non-zero lead end angle is formable between a central axis of the mechanical linkage and the lead vehicle, and a follower end pivot joint and follower end connector located at an opposing follower end of the mechanical linkage to pivotably connect by the follower end pivot joint the mechanical linkage to the follower vehicle whereby a non-zero follower end angle is formable between the central axis and the follower vehicle that is separate from the lead end angle, and wherein the follower end connector is translatable along the central axis relative to the lead end connector;

a sensor unit positioned along the mechanical linkage and configured to provide sensor data associated with the position of the follower vehicle relative to the lead vehicle; and a hard connect control unit positioned along the mechanical linkage and comprising one or more processors and a storage device coupled to the one or more processors, the storage device configured to store instructions that, when executed by the one or more processors, configure the one or more processors to autonomously drive the follower vehicle based on the sensor data provided to the hard connect control unit by the sensor unit.

13. The hard connect of claim 12, wherein the mechanical linkage comprises a compliance unit including a compliance member configured to permit the longitudinal length of the mechanical linkage extending between the lead end connector and the follower end connector to vary during the operation of the vehicle platoon.

14. The hard connect of claim 13, wherein the compliance member comprises one or more biasing members.

15. The hard connect of claim 13, wherein the compliance member comprises a cylinder and a piston slidably disposed within the cylinder.

16. A method for operating a vehicle platoon, the method comprising:

(a) driving by a human operator a lead vehicle of the vehicle platoon;

(b) transferring loads between the lead vehicle and a follower vehicle of the vehicle platoon by a mechanical linkage of a hard connect connected between the lead vehicle and the follower vehicle;

(c) pivoting a lead end connector of the mechanical linkage connected to the lead vehicle to form a non-zero lead end angle between a central axis of the mechanical linkage and the lead vehicle;

(d) pivoting a follower end connector of the mechanical linkage connected to the follower vehicle to form a non-zero follower end angle between the central axis and the follower vehicle that is separate from the lead end angle;

(e) translating the follower end connector along the central axis relative to the lead end connector; and (f) autonomously driving the follower vehicle by a hard connect control unit of the hard connect positioned along the mechanical linkage based on sensor data provided to the hard connect control unit by a sensor unit of the hard connect.

17. The method of claim 16, wherein the sensor data is associated with a position of the follower vehicle relative to the lead vehicle.

18. The method of claim 16, wherein (f) comprises controlling the operation of a follower powertrain system, a follower steering system, and a follower braking system of the follower vehicle.

19. The method of claim 16, further comprising:

(g) transmitting signals between the lead vehicle and the follower vehicle along a signal link established by the hard connect between the lead vehicle and the follower vehicle.

* * * * *